(12) United States Patent
Kim et al.

(10) Patent No.: US 11,160,024 B2
(45) Date of Patent: Oct. 26, 2021

(54) METHOD FOR RECEIVING FRAME IN WIRELESS LAN SYSTEM, AND WIRELESS TERMINAL USING SAME

(71) Applicant: LG ELECTRONICS INC., Seoul (KR)

(72) Inventors: Suhwook Kim, Seoul (KR); Kiseon Ryu, Seoul (KR); Jinyoung Chun, Seoul (KR); Jeongki Kim, Seoul (KR); Jinsoo Choi, Seoul (KR); Dongguk Lim, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/618,788

(22) PCT Filed: May 31, 2018

(86) PCT No.: PCT/KR2018/006215
§ 371 (c)(1),
(2) Date: Dec. 2, 2019

(87) PCT Pub. No.: WO2018/221979
PCT Pub. Date: Dec. 6, 2018

(65) Prior Publication Data
US 2020/0092815 A1    Mar. 19, 2020

Related U.S. Application Data

(60) Provisional application No. 62/512,734, filed on May 31, 2017, provisional application No. 62/528,156, filed on Jul. 3, 2017.

(51) Int. Cl.
*H04W 52/02* (2009.01)
*H04L 5/00* (2006.01)
(Continued)

(52) U.S. Cl.
CPC ....... *H04W 52/0235* (2013.01); *H04L 5/0046* (2013.01); *H04L 27/06* (2013.01); *H04W 84/12* (2013.01)

(58) Field of Classification Search
CPC ............. H04W 52/0235; H04W 84/12; H04W 52/028; H04W 52/0229; H04W 28/06;
(Continued)

(56) References Cited

U.S. PATENT DOCUMENTS

2010/0150043 A1*  6/2010  Kim ................. H04W 52/0235
                                                    370/311
2016/0183187 A1   6/2016  Park
(Continued)

FOREIGN PATENT DOCUMENTS

EP       2988557       2/2016
WO   2016/186738    11/2016

OTHER PUBLICATIONS

PCT International Application No. PCT/KR2018/006215, International Search Report dated Aug. 31, 2018, 3 pages.
(Continued)

*Primary Examiner* — Kwang B Yao
*Assistant Examiner* — Syed M Bokhari
(74) *Attorney, Agent, or Firm* — Lee, Hong, Degerman, Kang & Waimey

(57) ABSTRACT

A method for receiving a frame in a wireless LAN system according to the present embodiment comprises the steps of: receiving transmission speed information according to a transmission type of a wakeup packet for a WUR module from a second wireless terminal by a first wireless terminal including a main radio module and the WUR module, wherein the transmission speed information is set on the basis of at least three transmission speeds for the wakeup packet, and the transmission speed information is received
(Continued)

on the basis of the main radio module; and receiving the wakeup packet on the basis of the transmission speed information from the second wireless terminal by the first wireless terminal, wherein a header of the wakeup packet includes a transmission type indicator for the transmission type of the wakeup packet, the wakeup packet is modulated according to an on-off keying (OOK) scheme, and the wakeup packet is received on the basis of the WUR module.

6 Claims, 19 Drawing Sheets

(51) Int. Cl.
  *H04L 27/06* (2006.01)
  *H04W 84/12* (2009.01)
(58) Field of Classification Search
  CPC ....... H04L 5/0046; H04L 27/06; H04L 27/02; Y02D 30/70
  USPC .......................................................... 370/311
  See application file for complete search history.

(56) References Cited

U.S. PATENT DOCUMENTS

| 2017/0094600 | A1 | 3/2017 | Min et al. |
| 2018/0019902 | A1* | 1/2018 | Suh ...................... H04L 27/2602 |
| 2018/0176053 | A1* | 6/2018 | Park ........................ H04L 27/04 |
| 2018/0295578 | A1* | 10/2018 | Liu .......................... H04L 27/04 |
| 2018/0309538 | A1* | 10/2018 | Verma .................... H04W 28/22 |

OTHER PUBLICATIONS

Liu, J. et al., "Preamble Design for WUR WLAN", doc.: IEEE 802.11-17/0679r1, May 2017, 11 pages.
Park, M. et al., "LP-WUR (Low-Power Wake-Up Receiver) Follow-Up", doc.: IEEE 802.11-16/0341r0, Mar. 2016, 11 pages.
European patent application No. 18808691.2, European search report dated Apr. 23, 2020, 10 pages.
Erisson AB, IEEE 802.11ba Task Group Meeting Minutes for May 2017 Meeting, Daejeon, South Korea, IEEE 802.11-16/0524r1, May 2017, 39 pages.

* cited by examiner

FIG. 1
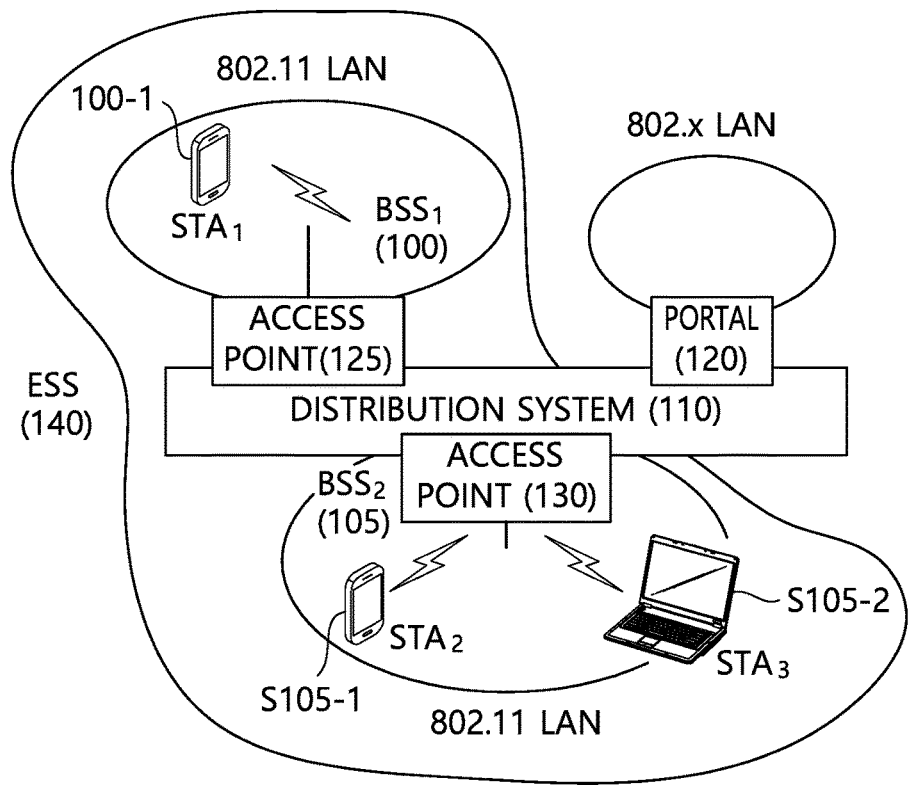
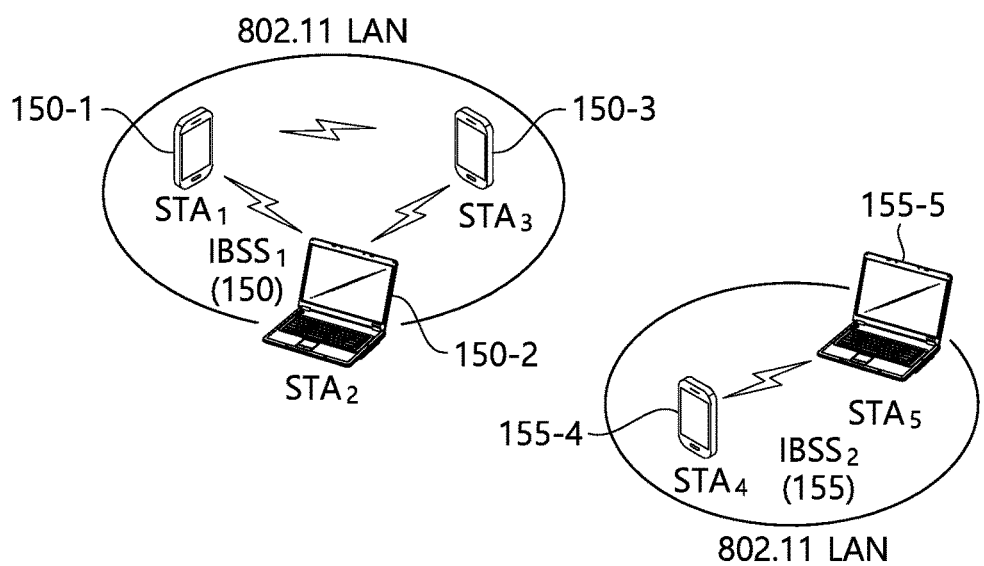

METHOD FOR RECEIVING FRAME IN WIRELESS LAN SYSTEM, AND WIRELESS TERMINAL USING SAME

CROSS-REFERENCE TO RELATED APPLICATIONS

This application is the National Stage filing under 35 U.S.C. 371 of International Application No. PCT/KR2018/006215, filed on May 31, 2018, which claims the benefit of U.S. Provisional Application No. 62/512,734, filed on May 31, 2017, and 62/528,156, filed on Jul. 3, 2017, the contents of which are all hereby incorporated by reference herein in their entirety.

BACKGROUND

Technical Field

The present disclosure relates to wireless communication, and more particularly, to a method for receiving a frame in a wireless LAN system and a wireless terminal using the same.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY

The present disclosure provides a method for receiving a frame in a wireless LAN system and a wireless terminal using the same.

In an aspect, provided is a method for receiving a frame in a wireless LAN system, including: receiving transmission rate information according to a transmission type of a wake-up packet for a WUR module from a second wireless terminal by a first wireless terminal including a main radio module and the WUR module, wherein the transmission rate information is set based on at least three transmission rates for the wake-up packet, and the transmission rate information is received based on the main radio module; and receiving the wake-up packet based on the transmission rate information from the second wireless terminal by the first wireless terminal, wherein a header of the wake-up packet includes a transmission type indicator for the transmission type of the wake-up packet, the wake-up packet is modulated according to an on-off keying (OOK) scheme, and the wake-up packet is received based on the WUR module.

According to an exemplary embodiment of the present disclosure, provided are a method for receiving a frame in a wireless LAN system and a wireless terminal using the same.

BRIEF DESCRIPTION OF THE DRAWINGS

FIG. 1 is a conceptual diagram illustrating a structure a wireless LAN system.

DESCRIPTION OF EXEMPLARY EMBODIMENTS

Figure 2:
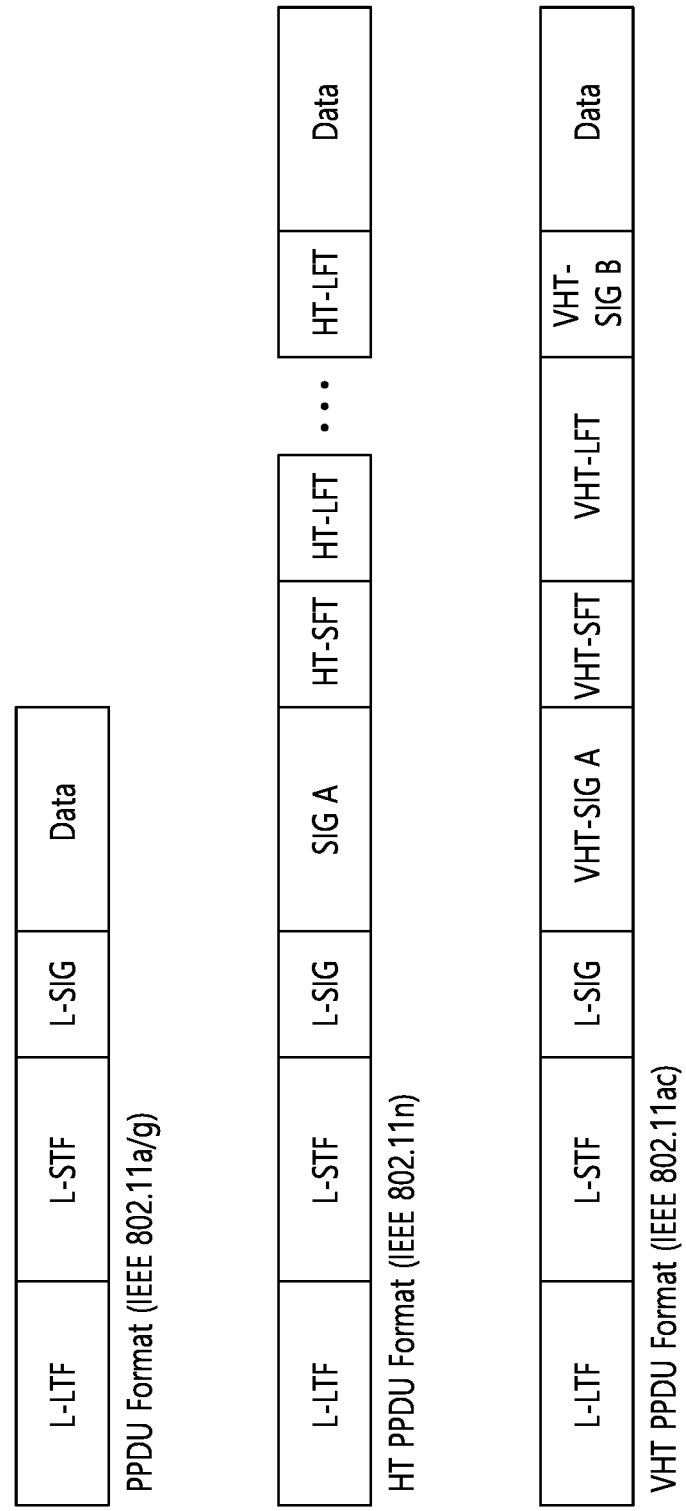
FIG. 2 is a diagram illustrating one example of PPDU in an IEEE standard.

The above-described features and the following detailed description are exemplary contents for helping a description and understanding of the present specification. That is, the present specification is not limited to this embodiment and may be embodied in other forms. The following embodiments are merely examples to fully disclose the present specification, and are descriptions to transfer the present specification to those skilled in the art. Therefore, when there are several methods for implementing components of the present specification, it is necessary to clarify that the present specification may be implemented with a specific one of these methods or equivalent thereof.

In the present specification, when there is a description in which a configuration includes specific elements, or when there is a description in which a process includes specific steps, it means that other elements or other steps may be further included. That is, the terms used in the present specification are only for describing specific embodiments and are not intended to limit the concept of the present specification. Furthermore, the examples described to aid the understanding of the present specification also include complementary embodiments thereof.

The terms used in the present specification have the meaning commonly understood by one of ordinary skill in the art to which the present specification belongs. Terms commonly used should be interpreted in a consistent sense in the context of the present specification. Further, terms used in the present specification should not be interpreted in an idealistic or formal sense unless the meaning is clearly defined. Hereinafter, embodiments of the present specification will be described with reference to the accompanying drawings.

FIG. 1 is a conceptual diagram illustrating a structure of a WLAN system. FIG. 1(A) illustrates a structure of an infrastructure network of institute of electrical and electronic engineers (IEEE) 802.11.

Referring to FIG. 1(A), a WLAN system 10 of FIG. 1(A) may include at least one basic service set (hereinafter, referred to as 'BSS') 100 and 105. The BSS is a set of access points (hereinafter, APs) and stations (hereinafter, STAs) that can successfully synchronize and communicate with each other and is not a concept indicating a specific area.

For example, a first BSS 100 may include a first AP 110 and one first STA 100-1. A second BSS 105 may include a second AP 130 and one or more STAs 105-1 and 105-2.

The infrastructure BSSs 100 and 105 may include at least one STA, APs 110 and 130 for providing a distribution service, and a distribution system (DS) 120 for connecting a plurality of APs.

The DS 120 may connect a plurality of BSSs 100 and 105 to implement an extended service set (hereinafter, 'ESS') 140. The ESS 140 may be used as a term indicating one network to which at least one AP 110 and 130 is connected through the DS 120. At least one AP included in one ESS 140 may have the same service set identification (hereinafter, SSID).

A portal 150 may serve as a bridge for connecting a WLAN network (IEEE 802.11) with another network (e.g., 802.X).

In a WLAN having a structure as illustrated in FIG. 1(A), a network between the APs 110 and 130 and a network between APs 110 and 130 and STAs 100-1, 105-1, and 105-2 may be implemented.

FIG. 1(B) is a conceptual diagram illustrating an independent BSS. Referring to FIG. 1(B), a WLAN system 15 of FIG. 1(B) may perform communication by setting a network between STAs without the APs 110 and 130, unlike FIG. 1(A). A network that performs communication by setting a network even between STAs without the APs 110 and 130 is defined to an ad-hoc network or an independent basic service set (hereinafter, 'BSS').

Referring to FIG. 1(B), an IBSS 15 is a BSS operating in an ad-hoc mode. Because the IBSS does not include an AP, there is no centralized management entity. Therefore, in the IBSS 15, STAs 150-1, 150-2, 150-3, 155-4, and 155-5 are managed in a distributed manner.

All STAs 150-1, 150-2, 150-3, 155-4, and 155-5 of the IBSS may be configured with mobile STAs, and access to a distributed system is not allowed. All STAs of the IBSS form a self-contained network.

The STA described in the present specification is a random function medium including a medium access control (hereinafter, MAC) following a standard of the Institute of Electrical and Electronics Engineers (IEEE) 802.11 standard and a physical layer interface for a wireless medium and may broadly be used as a meaning including both an AP and a non-AP station (STA).

The STA described in the present specification may also be referred to as various names such as a mobile terminal, a wireless device, a wireless transmit/receive unit (WTRU), a user equipment (UE), a mobile station (MS), a mobile subscriber unit, or simply a user.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
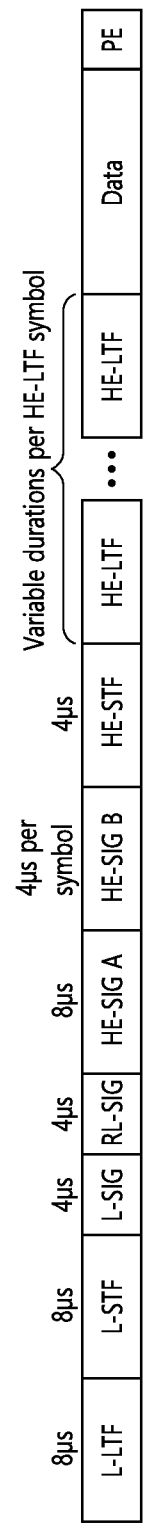
FIG. 3 is a diagram illustrating one example of HE PPDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

The PPDU used in the IEEE standard is mainly described as a PPDU structure transmitted with a channel bandwidth of 20 MHz. The PPDU structure transmitted with a bandwidth (e.g., 40 MHz and 80 MHz) wider than the channel bandwidth of 20 MHz may be a structure in which linear scaling is applied to the PPDU structure used in the channel bandwidth of 20 MHz.

The PPDU structure used in the IEEE standard may be generated based on 64 Fast Fourier Transforms (FTFs), and a cyclic prefix portion (CP portion) may be ¼. In this case, a length of an effective symbol interval (or FFT interval) may be 3.2 us, a CP length may be 0.8 us, and symbol duration may be 4 us (3.2 us+0.8 us) that adds the effective symbol interval and the CP length.

Figure 4:
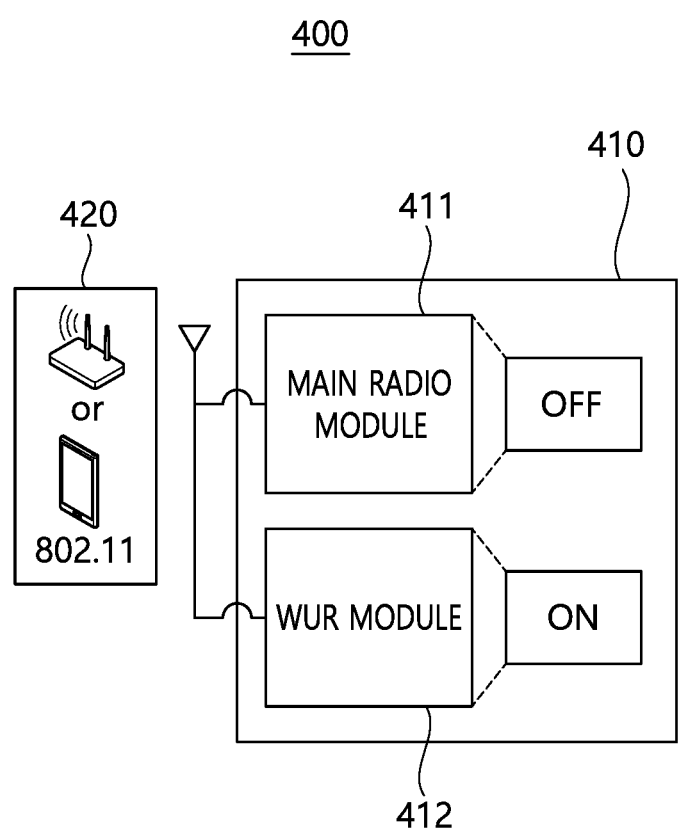
FIG. 4 is a block diagram of a wireless terminal receiving a wake-up packet.

FIG. 4 is an internal block diagram of a wireless terminal receiving a wake-up packet.

Referring to FIG. 4, a WLAN system 400 according to the present embodiment may include a first wireless terminal 410 and a second wireless terminal 420.

The first wireless terminal 410 may include a main radio module 411 related to main radio (i.e., 802.11) and a module 412 (hereinafter, WUR module) including a low-power wake-up receiver ('LP WUR'). The main radio module 411 may transmit or receive user data in an active state (i.e., ON state).

When there is no data (or packet) to be transmitted by the main radio module 411, the first radio terminal 410 may control the main radio module 411 to enter an inactive state (i.e., OFF state). For example, the main radio module 411 may include a plurality of circuits supporting Wi-Fi, Bluetooth® radio (hereinafter, BT radio), and Bluetooth® Low Energy radio (hereinafter, BLE radio).

In the related art, a wireless terminal operating based on a power save mode may operate in an active state or a sleep state.

For example, a wireless terminal in an active state may receive all frames from another wireless terminal. Further, a wireless terminal in a sleep state may receive a specific type of frame (e.g., a beacon frame transmitted periodically) transmitted by another wireless terminal (e.g., AP).

It is assumed that a wireless terminal described in the present specification may operate a main radio module in an active state or in an inactive state.

A wireless terminal including a main radio module 411 in an inactive state (i.e., OFF state) may not receive a frame (e.g., 802.11 type PPDU) transmitted by another wireless terminal (e.g., AP) until the main radio module is woken up by the WUR module 412.

In other words, a wireless terminal including the main radio module 411 in an inactive state (i.e., OFF state) may not receive a beacon frame periodically transmitted by the AP.

That is, it may be understood that a wireless terminal including a main radio module (e.g., 411) in an inactive state (i.e., OFF state) according to the present embodiment is in a deep sleep state.

Further, a wireless terminal including the main radio module 411 in an active state (i.e., ON state) may receive a frame (e.g., 802.11 type PPDU) transmitted by another wireless terminal (e.g., AP).

Further, it is assumed that a wireless terminal described in the present specification may operate the WUR module in a turn-off state or in a turn-on state.

A wireless terminal including the WUR module 412 in a turn-on state may receive only a specific type of frame transmitted by other wireless terminals. In this case, the specific type of frame may be understood as a frame modulated by an on-off keying (OOK) modulation scheme to be described later with reference to FIG. 5.

A wireless terminal including the WUR module 412 in a turn-off state may not receive a specific type of frame transmitted by other wireless terminals.

In the present specification, in order to represent an ON state of a specific module included in the wireless terminal, terms of an active state and a turn-on state may be used interchangeably. In the same context, in order to represent an OFF state of a particular module included in the wireless terminal, terms of an inactive state and a turn-off state may be used interchangeably.

The wireless terminal according to the present embodiment may receive a frame (or packet) from another wireless terminal based on the main radio module 411 or the WUR module 412 in an active state.

The WUR module 412 may be a receiver for waking the main radio module 411. That is, the WUR module 412 may not include a transmitter. The WUR module 412 may maintain a turn-on state for duration in which the main radio module 411 is in an inactive state.

For example, when a wake-up packet (hereinafter, WUP) for the main radio module 411 is received, the first radio terminal 410 may control the main radio module 411 in an inactive state to enter an active state.

The low-power wake-up receiver (LP WUR) included in the WUR module 412 targets target power consumption of less than 1 mW in an active state. Further, the low-power wake-up receiver may use a narrow bandwidth of less than 5 MHz.

Further, power consumption by the low-power wake-up receiver may be less than 1 Mw. Further, a target transmission range of the low-power wake-up receiver may be the same as that of existing 802.11.

The second wireless terminal 420 according to the present embodiment may transmit user data based on main radio (i.e., 802.11). The second wireless terminal 420 may transmit a wake-up packet (WUP) for the WUR module 412.

The second wireless terminal 420 may not transmit user data or a wake-up packet (WUP) for the first wireless terminal 410. In this case, the main radio module 411 included in the second wireless terminal 420 may be in an inactive state (i.e., OFF state), and the WUR module 412 may be in a turn-on state (i.e., ON state).

Figure 5:
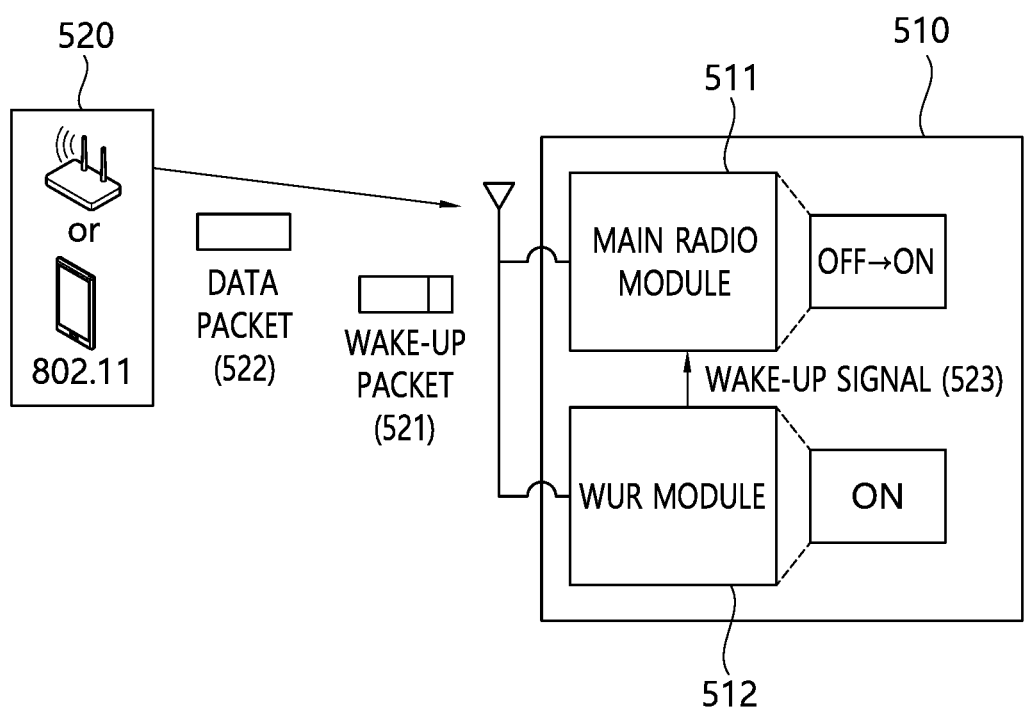
FIG. 5 is a conceptual diagram illustrating a method for receiving, by a wireless terminal, a wake-up packet and a data packet.

FIG. 5 is a conceptual diagram illustrating a method in which a wireless terminal receives a wake-up packet and a data packet.

Referring to FIGS. 4 and 5, a WLAN system 500 according to the present embodiment may include a first wireless terminal 510 corresponding to a receiving terminal and a second wireless terminal 520 corresponding to a transmitting terminal. A basic operation of the first wireless terminal 510 of FIG. 5 may be understood through a description of the first wireless terminal 410 of FIG. 4. Similarly, a basic operation of the second wireless terminal 520 of FIG. 5 may be understood through a description of the second wireless terminal 420 of FIG. 4.

Referring to FIG. 5, when a wake-up packet 521 is received in a WUR module 512 in an active state, the WUR module 512 may transfer a wake-up signal 523 to a main radio module 511 so that the main radio module 511 may accurately receive a data packet 522 to be received after the wake-up packet 521.

For example, the wake-up signal 523 may be implemented based on primitive information inside the first wireless terminal 510.

For example, when the main radio module 511 receives the wake-up signal 523, the main radio module 511 may activate all or only a part of a plurality of circuits (not illustrated) supporting Wi-Fi, BT radio, and BLE radio included therein.

As another example, actual data included in the wake-up packet 521 may be directly transferred to a memory block (not illustrated) of the receiving terminal even if the main radio module 511 is in an inactive state.

As another example, when the wake-up packet 521 includes an IEEE 802.11 MAC frame, the receiving terminal may activate only a MAC processor of the main radio module 511. That is, the receiving terminal may maintain a PHY module of the main radio module 511 in an inactive state. The wake-up packet 521 of FIG. 5 will be described in more detail with reference to the following drawings.

The second wireless terminal 520 may be set to transmit the wake-up packet 521 to the first wireless terminal 510. Namely, the second wireless terminal 520 may control the main radio module 511 of the first wireless terminal 510 to enter an active state (i.e., ON state) according to the wake-up packet 521.

Figure 6:
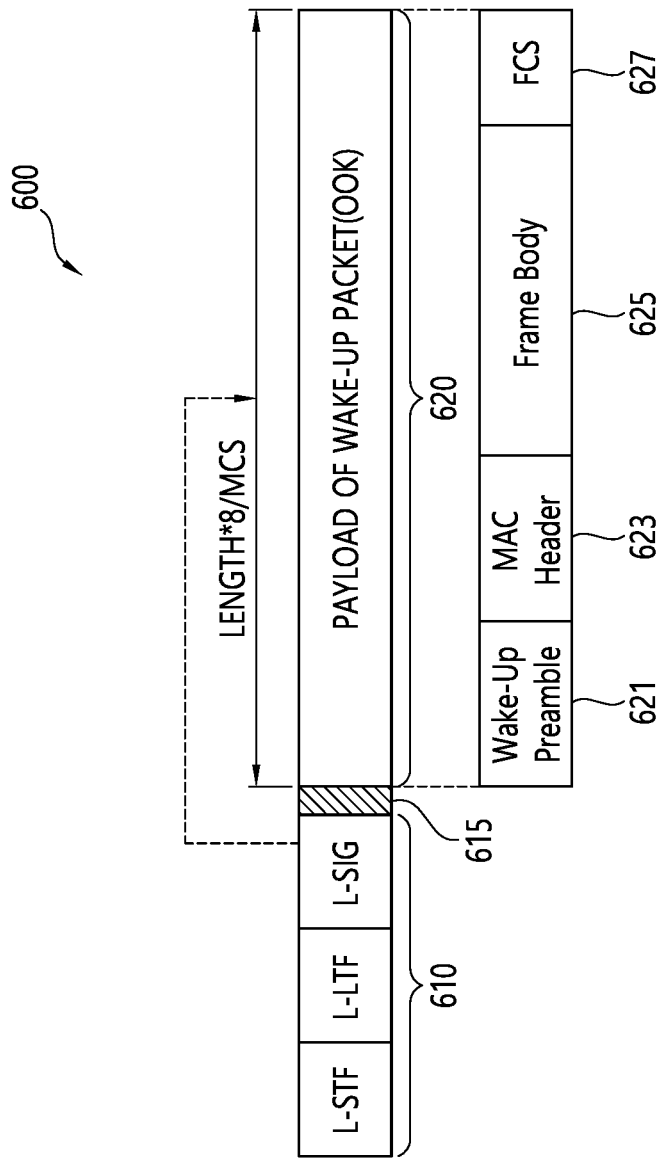
FIG. 6 illustrates one example of a format of a wake-up packet.

FIG. 6 illustrates an example of a format of a wake-up packet.

Referring to FIGS. 1 to 6, a wake-up packet 600 may include one or more legacy preambles 610. For instance, a legacy preamble 610 may be modulated based on a conventional Orthogonal Frequency Division Multiplexing (OFDM) scheme.

Further, the wake-up packet 600 may include a payload 620 after the legacy preamble 610. For instance, the payload 620 may be modulated by a simple modulation scheme (e.g., On-Off Keying (OOK) modulation scheme). The wake-up packet 600 including a payload may be transmitted based on a relatively small bandwidth.

Referring to FIGS. 1 to 6, a second wireless terminal (e.g., 520) may be configured to generate and/or transmit wake-up packets 521 and 600. The first wireless terminal (e.g., 510) may be configured to process the received wake-up packet 521.

The wake-up packet 600 may include a legacy preamble 610 or any other preamble (not illustrated) defined in the existing IEEE 802.11 standard.

The wake-up packet 600 may include one packet symbol 615 after the legacy preamble 610. Further, the wake-up packet 600 may include a payload 620.

The legacy preamble 610 may be provided for coexistence with a legacy STA. In other words, the legacy preamble 610 may be provided to a third party STA (i.e., STA(s) not including LP-WUR). Namely, the legacy preamble 610 may not be decoded by a WUR STA including a WUR module.

In the legacy preamble 610 for coexistence, an L-SIG field for protecting a packet may be used. For example, the 802.11 STA may detect a start portion of a packet through an L-STF field in the legacy preamble 610. The 802.11 STA may detect an end portion of the 802.11 packet (i.e., an end portion of WUP) through the L-SIG field in the legacy preamble 610.

In order to reduce false alarm of an 802.11n terminal, a modulated symbol 615 may be added after the L-SIG of FIG. 6. One symbol 615 may be modulated according to a BiPhase Shift Keying (BPSK) technique. One symbol 615 may have a length of 4 us. One symbol 615 may have a bandwidth of 20 MHz, as in a legacy part.

The payload 620 may include a wake-up preamble field 621, a MAC header field 623, a frame body field 625, and a frame check sequence (FCS) field 627.

The wake-up preamble field 621 may include a sequence for identifying the wake-up packet 600. For example, the wake-up preamble field 621 may include a pseudo random noise (PN) sequence.

The MAC header field 624 may include address information (or an identifier of a receiving device) indicating a receiving terminal for receiving the wake-up packet 600. The frame body field 626 may include other information of the wake-up packet 600.

The frame body 626 may include length information or size information of a payload. Referring to FIG. 6, the length information of the payload may be calculated based on LENGTH information and MCS information included in the legacy preamble 610.

The FCS field 628 may include a Cyclic Redundancy Check (CRC) value for error correction. For example, the FCS field 628 may include a CRC-8 value or a CRC-16 value for the MAC header field 623 and the frame body 625.

Figure 7:
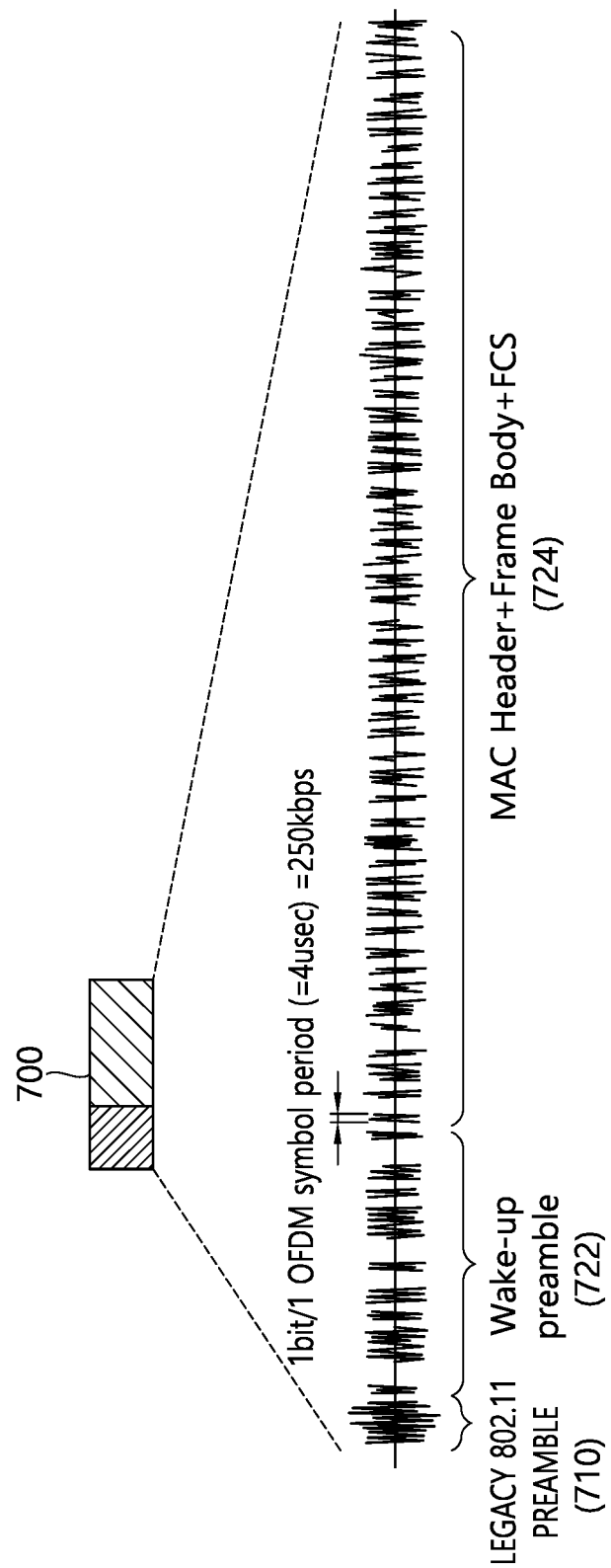
FIG. 7 illustrates a signal waveform of a wake-up packet.

FIG. 7 illustrates a signal waveform of a wake-up packet.

Referring to FIG. 7, a wake-up packet 700 may include a legacy preamble (802.11 preamble) 710 and payloads 722 and 724 modulated based on an On-Off Keying (OOK) technique. That is, the wake-up packet WUP according to the present embodiment may be understood in a form in which a legacy preamble and a new LP-WUR signal waveform coexist.

An OOK technique may not be applied to the legacy preamble 710 of FIG. 7. As described above, the payloads 722 and 724 may be modulated according to the OOK technique. However, the wake-up preamble 722 included in the payloads 722 and 724 may be modulated according to another modulation technique.

For example, it may be assumed that the legacy preamble 710 is transmitted based on a channel band of 20 MHz to which 64 FFTs are applied. In this case, the payloads 722 and 724 may be transmitted based on a channel band of about 4.06 MHz.

Figure 8:
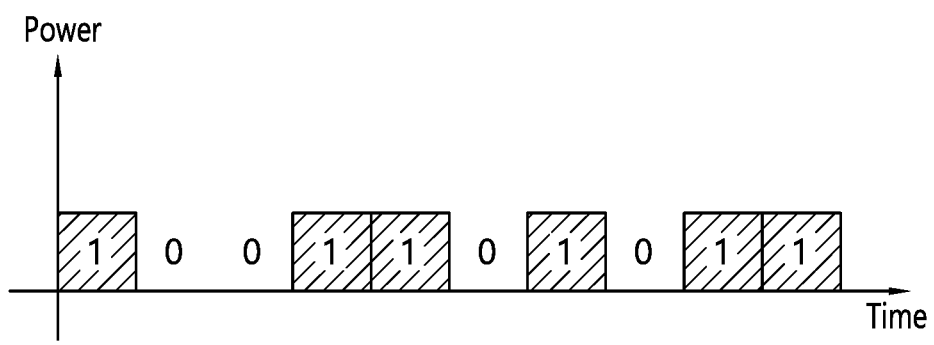
FIG. 8 is a diagram for describing a procedure in which power consumption is determined according to a ratio of a bit value configuring information of a binary sequence type.

FIG. 8 is a diagram illustrating a procedure of determining power consumption according to a ratio of bit values constituting information of a binary sequence form.

Referring to FIG. 8, information of a binary sequence form having '1' or '0' as a bit value may be represented. Communication according to an OOK modulation scheme may be performed based on bit values of information of a binary sequence form.

For example, when a light emitting diode is used for visible light communication, if a bit value constituting information of a binary sequence form is '1', the light emitting diode may be turned on, and if a bit value constituting information of a binary sequence form is '0', the light emitting diode may be turned off.

As the light emitting diode blinks, the receiver receives and restores data transmitted in the form of visible light, thereby enabling communication using visible light. However, because blinking of the light emitting diode may not be recognized by the human eye, the person feels that lighting is continuously maintained.

For convenience of description, as illustrated in FIG. 8, information of a binary sequence form having 10 bit values may be provided. For example, information of a binary sequence form having a value of '1001101011' may be provided.

As described above, when the bit value is '1', if the transmitting terminal is turned on and when the bit value is '0', if the transmitting terminal is turned off, symbols corresponding to 6 bit values of the above 10 bit values are turned on.

Because the wake-up receiver WUR according to the present embodiment is included in the receiving terminal, transmission power of the transmitting terminal may not be greatly considered. The reason why an OOK technique is used in the present embodiment is because power consumption in a decoding procedure of a received signal is very small.

Until a decoding procedure is performed, there may be no significant difference between power consumed by the main radio and power consumed by the WUR. However, as a decoding procedure is performed by the receiving terminal, a large difference may occur between power consumed by the main radio module and power consumed by the WUR module. The following description is approximate power consumption.

Existing Wi-Fi power consumption is about 100 mW. Specifically, power consumption of Resonator+Oscillator+PLL (1,500 uW)→LPF (300 uW)→ADC (63 uW)→decoding processing (Orthogonal frequency-division multiplexing (OFDM) receiver) (100 mW) may occur.

However, WUR power consumption is about 1 mW. Specifically, power consumption of Resonator+Oscillator (600 uW)→LPF (300 uW)→ADC (20 uW)→decoding processing (Envelope detector) (1 uW) may occur.

Figure 9:
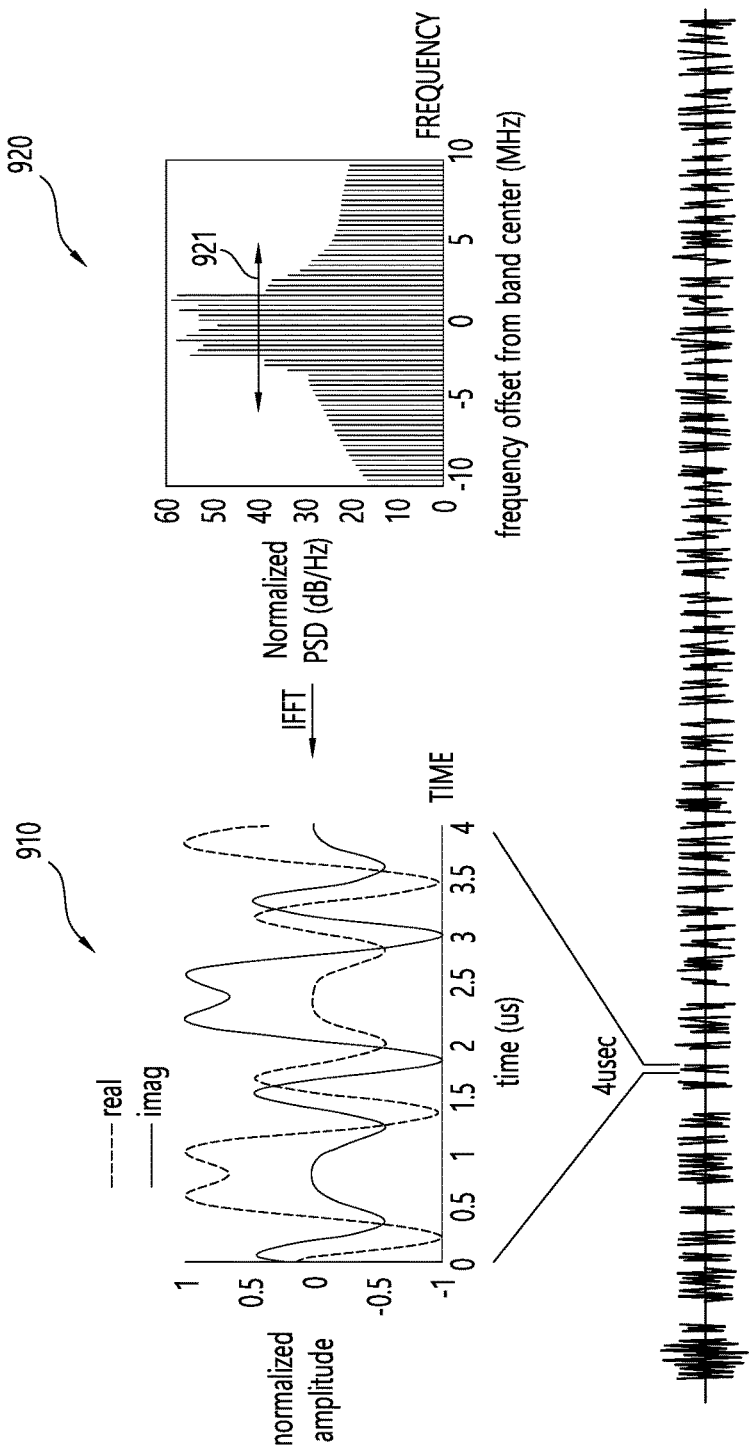
FIG. 9 is a diagram illustrating a design process of a pulse according to an OOK technique.

FIG. 9 is a diagram illustrating a design process of a pulse according to an OOK technique.

A wireless terminal according to the present embodiment may use an existing orthogonal frequency-division multiplexing (OFDM) transmitter of 802.11 in order to generate pulses according to an OOK technique. The existing 802.11 OFDM transmitter may generate a 64-bit sequence by applying 64-point IFFT.

Referring to FIGS. 1 to 9, the wireless terminal according to the present embodiment may transmit a payload of a modulated wake-up packet (WUP) according to an OOK technique. The payload (e.g., 620 of FIG. 6) according to the present embodiment may be implemented based on an ON-signal and an OFF-signal.

The OOK technique may be applied for the ON-signal included in the payload (e.g., 620 of FIG. 6) of the WUP. In this case, the ON-signal may be a signal having an actual power value.

With reference to a frequency domain graph 920, an ON-signal included in the payload (e.g., 620 of FIG. 6) may be obtained by performing IFFT for the N2 number of subcarriers (N2 is a natural number) among the N1 number of subcarriers (N1 is a natural number) corresponding to a channel band of the WUP. Further, a predetermined sequence may be applied to the N2 number of subcarriers.

For example, a channel band of the WUP may be 20 MHz. The N1 number of subcarriers may be 64 subcarriers, and the N2 number of subcarriers may be consecutive 13 subcarriers (921 of FIG. 9). A subcarrier interval applied to the wake-up packet (WUP) may be 312.5 kHz.

The OOK technique may be applied for an OFF-signal included in the payload (e.g., 620 of FIG. 6) of the WUP. The OFF-signal may be a signal that does not have an actual power value. That is, the OFF-signal may not be considered in a configuration of the WUP.

The ON-signal included in the payload (620 of FIG. 6) of the WUP may be determined (i.e., demodulated) to a 1-bit ON-signal (i.e., '1') by the WUR module (e.g., 512 of FIG. 5). Similarly, the OFF-signal included in the payload may be determined (i.e., demodulated) to a 1-bit OFF-signal (i.e., '0') by the WUR module (e.g., 512 of FIG. 5).

A specific sequence may be preset for a subcarrier set 921 of FIG. 9. In this case, the preset sequence may be a 13-bit sequence. For example, a coefficient corresponding to the DC subcarrier in the 13-bit sequence may be '0', and the remaining coefficients may be set to '1' or With reference to the frequency domain graph 920, the subcarrier set 921 may correspond to a subcarrier whose subcarrier indices are '−6' to '+6'.

For example, a coefficient corresponding to a subcarrier whose subcarrier indices are '−6' to in the 13-bit sequence may be set to '1' or A coefficient corresponding to a subcarrier whose subcarrier indices are '1' to '6' in the 13-bit sequence may be set to '1' or '−1'.

For example, a subcarrier whose subcarrier index is '0' in the 13-bit sequence may be nulled. All coefficients of the remaining subcarriers (subcarrier indexes '−32' to '−7' and subcarrier indexes '+7' to '+31'), except for the subcarrier set 921 may be set to '0'.

The subcarrier set 921 corresponding to consecutive 13 subcarriers may be set to have a channel bandwidth of about 4.06 MHz. That is, power by signals may be concentrated at 4.06 MHz in the 20 MHz band for the wake-up packet (WUP).

When a pulse according to the OOK technique is used, power is concentrated in a specific band and thus there is an advantage that a signal to noise ratio (SNR) may increase, and in an AC/DC converter of the receiver, there is an advantage that power consumption for conversion may be reduced. Because a sampling frequency band is reduced to 4.06 MHz, power consumption by the wireless terminal may be reduced.

An OFDM transmitter of 802.11 may have may perform IFFT (e.g., 64-point IFFT) for the N2 number (e.g., consecutive 13) of subcarriers of the N1 number (e.g., 64) of subcarriers corresponding to a channel band (e.g., 20 MHz band) of a wake-up packet.

In this case, a predetermined sequence may be applied to the N2 number of subcarriers. Accordingly, one ON-signal may be generated in a time domain One bit information corresponding to one ON-signal may be transferred through one symbol.

For example, when a 64-point IFFT is performed, a symbol having a length of 3.2 us corresponding to a subcarrier set 921 may be generated. Further, when a cyclic prefix (CP, 0.8 us) is added to a symbol having a length of 3.2 us corresponding to the subcarrier set 921, one symbol having a total length of 4 us may be generated, as in the time domain graph 910 of FIG. 9.

Further, the OFDM transmitter of 802.11 may not transmit an OFF-signal.

According to the present embodiment, a first wireless terminal (e.g., 510 of FIG. 5) including a WUR module (e.g., 512 of FIG. 5) may demodulate a receiving packet based on an envelope detector that extracts an envelope of a received signal.

For example, the WUR module (e.g., 512 of FIG. 5) according to the present embodiment may compare a power level of a received signal obtained through an envelope of the received signal with a predetermined threshold level.

If a power level of the received signal is higher than a threshold level, the WUR module (e.g., 512 of FIG. 5) may determine the received signal to a 1-bit ON-signal (i.e., '1'). If a power level of the received signal is lower than a threshold level, the WUR module (e.g., 512 of FIG. 5) may determine the received signal to a 1-bit OFF-signal (i.e., '0').

Based on the present specification, a basic data rate for one information can be set to 125 Kbps (8 us) or 62.5 Kbps (16 us).

Generalizing contents of FIG. 9, each signal having a length of K (e.g., K is a natural number) in the 20 MHz band may be transmitted based on consecutive K subcarriers of 64 subcarriers for the 20 MHz band. For example, K may correspond to the number of subcarriers used for transmitting a signal. Further, K may correspond to a bandwidth of a pulse according to the OOK technique.

All coefficients of the remaining subcarriers, except for K subcarriers among 64 subcarriers may be set to '0'.

Specifically, for a one bit OFF-signal corresponding to '0' (hereinafter, information 0) and a one bit ON-signal corresponding to '1' (hereinafter, information 1), the same K subcarriers may be used. For example, the used index for the K subcarriers may be expressed as 33-floor (K/2): 33+ceil (K/2)−1.

In this case, the information 1 and the information 0 may have the following values.

Information 0=zeros (1, K)
Information 1=alpha*ones (1, K)

The alpha is a power normalization factor and may be, for example, 1/sqrt (K).

Hereinafter, for simple and clear understanding in the present specification, when the main radio module (e.g., 511 of FIG. 5, 1311 of FIG. 13) of the wireless terminal (e.g., 510 of FIG. 5) is in an inactive state (i.e., OFF state) and when the WUR module (e.g., 512 of FIG. 5) is in a turn-on state (i.e., ON state), it may be described that the wireless terminal operates in a WUR mode or a low power mode.

Furthermore, it may be mentioned that when the main radio module (e.g., reference numeral 511 in FIG. 5) of the wireless terminal (e.g., reference numeral 510 in FIG. 5) is in an activation state (i.e., ON state) and the WUR module (e.g., reference numeral 512 in FIG. 5) is in a turn-off state (i.e., OFF state), the wireless terminal operates in a normal mode.

Hereinafter, for simple and clear appreciation of this specification, it may be mentioned that the main radio module (e.g., reference numeral 511 in FIG. 5 and reference numeral 1311 in FIG. 13) of the wireless terminal (e.g., reference numeral 510 in FIG. 5) is in a deactivation state (i.e., OFF state) and the WUR module (e.g., reference numeral 512 in FIG. 5) is in a turn-on state (i.e., ON state), the wireless terminal operates in a WUR mode or a low-power mode.

Furthermore, it may be mentioned that the main radio module (e.g., reference numeral 511 in FIG. 5 and reference numeral 1311 in FIG. 13) of the wireless terminal (e.g., reference numeral 510 in FIG. 5) is in the activation state (i.e., ON state) and the WUR module (e.g., reference numeral 512 in FIG. 5) is in the turn-off state (i.e., OFF state), the wireless terminal operates in the normal mode.

Figure 10:
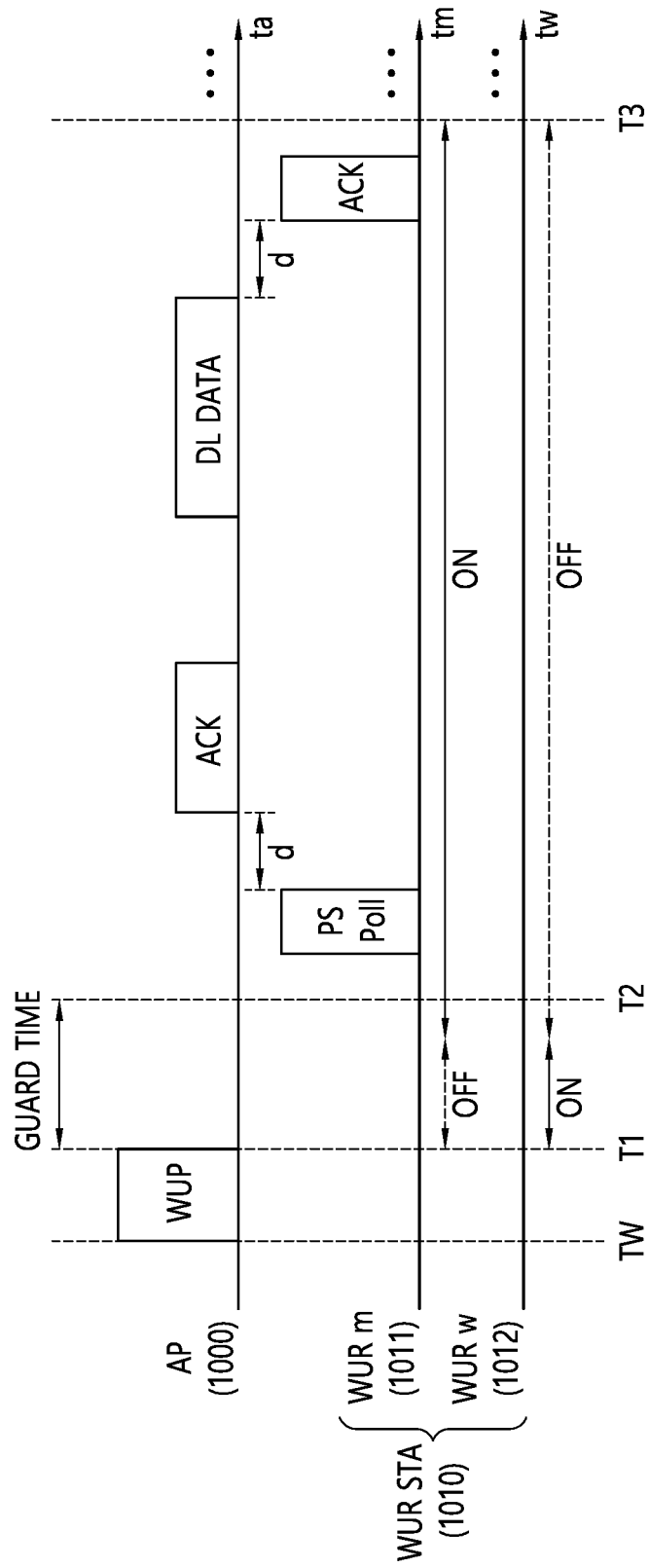
FIG. 10 is a diagram illustrating an operation of a low-power mode performed based on a wake-up packet according to a unicast technique according to an exemplary embodiment.

FIG. 10 is a diagram illustrating an operation of a low-power mode performed based on a wake-up packet according to a unicast technique according to an exemplary embodiment.

According to the exemplary embodiment, the wireless terminal may include a main radio module 1011 for receiving a signal of a legacy wireless LAN system and a WUR module 1012 for receiving a signal modulated by an OOK technique. Here, the wireless terminal according to this specification may be mentioned as the WUR terminal.

Referring to FIG. 10, a horizontal axis of an access point (AP) 1000 may indicate a time to and a vertical axis may be associated with presence of a frame to be transmitted by the AP 1000. For example, a main radio module 1011 of FIG. 10 may correspond to the main radio module 511 of FIG. 5. The WUR module 1012 of FIG. 10 may correspond to the WUR module 512 of FIG. 5.

The horizontal axis of the main radio module 1011 of FIG. 10 may indicate a time tm. Further, an arrow to be shown below the horizontal axis of the main radio module 1011 of FIG. 10 may indicate a power state (e.g., the ON state or OFF state) of the main radio module 1011. The vertical axis of the main radio module 1011 of FIG. 10 may be associated with presence of the frame to be transmitted by the main radio module 1011.

In this specification, the remaining packet except for the wake-up packet (WUP) among various types of packets transmitted by the AP 1000 may be received based on the main radio module 1011. Accordingly, in this specification, the main radio module 1011 may be referred to as (Primary Radio Connectivity, hereinafter, referred to as 'PCR').

The horizontal axis of the WUR module 1012 of FIG. 10 may indicate a time tw. Further, an arrow to be shown below the horizontal axis of the WUR module 1012 of FIG. 10 may indicate the power state (e.g., the ON state or OFF state) of the WUR module 1012. The vertical axis of the WUR module 1012 of FIG. 10 may be associated with presence of the frame to be transmitted by the WUR module 1012.

The WUR terminal 1010 of FIG. 10 may be appreciated as a wireless terminal associated with the AP through a predetermined association procedure.

It may be assumed that during a wake-up interval (TW to T1) of FIG. 10, the main radio module 1011 of the WUR terminal 1010 is in the deactivation state (i.e., OFF state) and the WUR terminal 1012 is in the turn-on state (i.e., ON state).

During the wake-up interval (TW to T1) of FIG. 10, the AP 1000 may transmit the wake-up packet (hereinafter, referred to as 'WUP'). For example, the wake-up packet (WUP) of FIG. 10 may indicate the main radio module (e.g., 1021) included in the WUR terminal (e.g., 1010) to enter the activation state according to the unicast technique.

The wake-up packet (WUP) of FIG. 10 may include a payload modulated according to the on-off keying (OOK) technique for the WUR module 1012. For example, the payload may be generated based on an ON signal determined as a 1-bit ON signal by the WUR module 1012 and an OFF signal determined as a 1-bit OFF signal by the WUR module 1012.

The payload mentioned in FIG. 10 may be transmitted based on sub-channels which belong to a channel band (e.g., 20 MHz) corresponding to N (e.g., 64) subcarriers of FIG. 9. The sub-channels mentioned in FIG. 10 may be implemented based on N1 (e.g., 13) subcarriers among N (e.g., 64) subcarriers of FIG. 9.

As one example, the ON signal included in the payload may be acquired by performing Inverse Fast Fourier Transform (IFFT) with respect to N1 (e.g., 13) subcarriers among N (e.g., 64) subcarriers corresponding to the channel band of the wake-up packet (WUP).

In this specification, a delay time required until the main radio module 1011 enters the activation state (i.e., ON state) according to the wake-up signal (e.g., reference numeral 523 of FIG. 5) which is a primitive signal generated in the WUR terminal based on the received wake-up packet (WUP) may be mentioned as a Turn-On Delay (hereinafter, referred to as 'TOD').

As one example, a guide time may be introduced in order to reduce the occurrence of unnecessary overhead and delay caused by a mismatch in power state between the AP and the WUR terminal due to the TOD.

As one example, the guard time for the wake-up packet (WUP) may be appreciated as a first interval (T1 to T2) of FIG. 10. In this case, the first interval (T1 to T2) of FIG. 10 may be set according to a predetermined parameter for the guard time.

As one example, the guard time set in the WUR terminal 1010 of FIG. 10 may be configured to have a specific time interval (e.g., T1 to T2 of FIG. 10). The AP 1000 may wait without transmitting any packet until the first interval (T1 to T2) of FIG. 10 corresponding to the guard time of FIG. 10 elapses.

For simple and clear description of the exemplary embodiment, it may be assumed that the WUR terminal 1010 is switched from the WUR mode to the normal mode before the first interval (e.g., T1 to T2 of FIG. 10) corresponding to the guard time elapses.

During a second interval (T2 to T3) of FIG. 10, the WUR terminal 1010 may transmit a Power Save (PS)-Poll frame. In order to inform the AP 1000 that the main radio module 1011 enters the activation state (i.e., ON state) based on the received wake-up packet (WUP), the WUR terminal 1010 may transmit the PS-poll frame.

In this case, the PS-poll frame may be individually transmitted based on the main radio module 1011 included in the WUR terminal 1010. That is, when the PS-poll frame is received, the AP 1000 may determine that the wake-up packet (WUP) is successfully received by the WUR terminal 1010.

Subsequently, during the second interval (T2 to T3) of FIG. 10, when a predetermined time d elapses after receiving of the PS-poll frame, the AP 1000 may transmit an acknowledgement (ACK) frame. In this case, the predetermined time d may be SIFS. For example, the ACK frame of FIG. 10 may be received by the WUR terminal 1010 based on the main radio module 1011 in the activation state (i.e., ON state).

Subsequently, during the second interval (T2 to T3) of FIG. 10, the AP 1000 may transmit a buffered downlink data DL DATA for the WUR terminal 1010. In this case, the WUR terminal 1010 may receive the downlink data DL DATA based on the main radio module 1011.

Subsequently, during the second interval (T2 to T3) of FIG. 10, when the predetermined time d elapses after receiving of the downlink data (DL DATA) frame, the WUR terminal 1010 may transmit the acknowledgement (ACK) frame in order to announce successful reception of the downlink data (DL DATA) frame. In this case, the ACK frame may be transmitted based on the main radio module 1011.

Figure 11A:
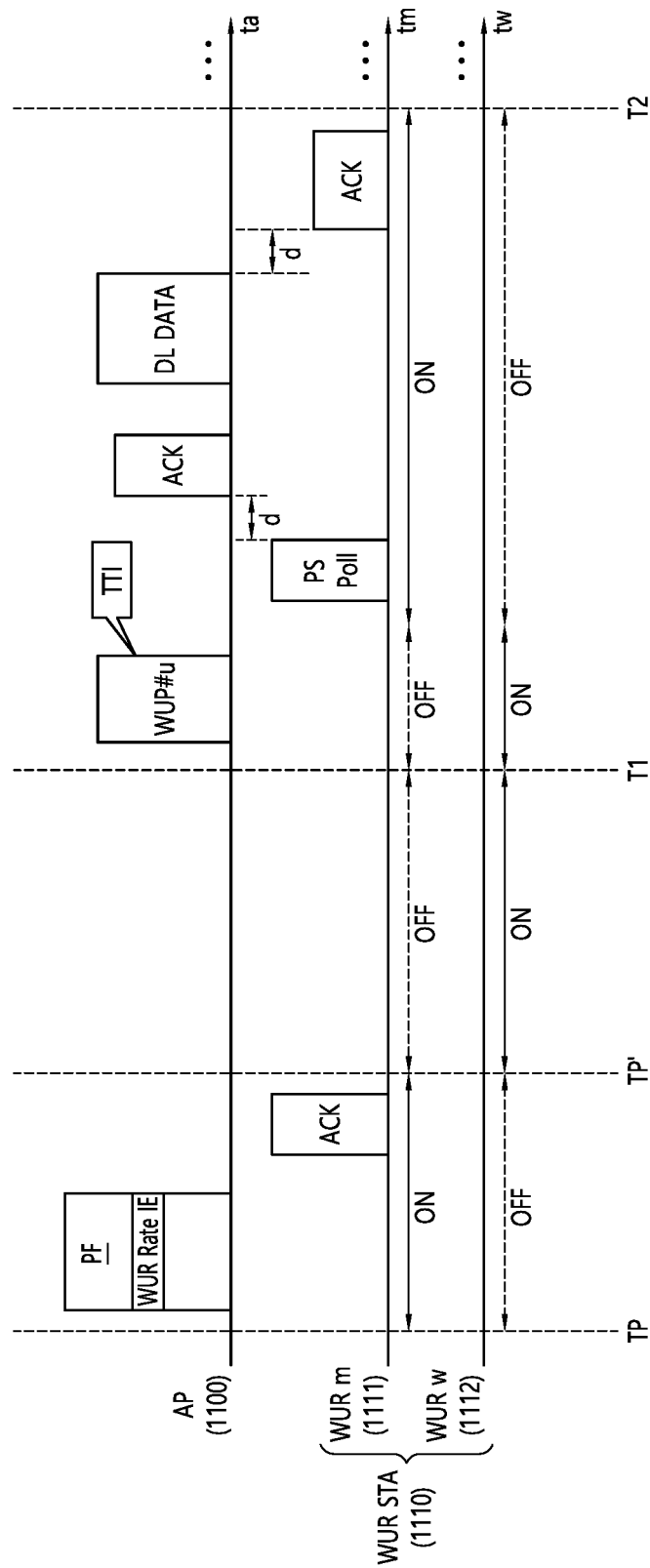
FIGS. 11A and 11B are diagrams illustrating an exemplary embodiment of receiving a wake-up packet based on transmission rate information.

FIG. 11A is a diagram illustrating an operation of receiving a wake-up packet based on transmission rate information according to the exemplary embodiment. The AP 1100 and the WUR terminal 1110 of FIG. 11A may be appreciated based on description of the AP 1000 and the WUR terminal 1010 of FIG. 10.

During a PCR interval (TP to TP') of FIG. 11A, the AP 1100 may transmit a primary connectivity radio frame (PCR) frame (hereinafter, referred to as 'PF'). As one example, the PCR frame PF may be received by the main radio module 1111 which is in the activation state (i.e., ON state) of the WUR terminal 1111.

For example, the PCR frame PF may be appreciated as a frame exchanged at an initial association step between the AP 1100 and the WUR terminal 1110 for signaling of the WUR mode. As one example, the PCR frame PF may include individual information for the WUR mode of the WUR terminal 1110.

In this case, the PCR frame PF may include transmission rate information related to a transmission type of the wake-up packet (WUP) for the WUR terminal 1110. In this case, the PCR frame PF may be transmitted according to the unicast technique.

As another example, the PCR frame PF may be appreciated as a beacon frame periodically transmitted by the AP 1100. In this case, the PCR frame PF may include various setting information for the WUR terminal 1110.

In this case, the PCR frame PF may include transmission rate information related to the transmission type of the wake-up packet (WUP) for at least one WUR terminal associated with the AP. In this case, the PCR frame PF may be transmitted according to the multicast technique or a broadcast technique.

Subsequently, the WUR terminal 1110 may transmit the ACK frame based on the main radio module 1111 which is in the activation state (i.e., ON state) in order to announce successful reception of the PCR frame PF.

Hereinafter, the transmission rate information related to the transmission type of the wake-up packet (WUP) may be referred to as a WUR rate information element (hereinafter, referred to as 'WUR Rate IE').

According to the exemplary embodiment, the WUR Rate information element (WUR Rate IE) may be configured based on at least three transmission rates available for transmission of the wake-up packet (WUP). For example, at least three transmission rates may be associated based on a plurality of transmission rates listed in Table 1 below.

TABLE 1

| WUR Transmission rate |
| --- |
| 31.25 kbps |
| 62.5 kbps |
| 125 kbps |
| 250 kbps |
| 500 kbps |
| 1 mbps |

When the wireless terminal is in the WUR mode, the location of the wireless terminal may be changed with movement. A transmission distance of the WUR module needs to coincide with the transmission distance of 802.11 radio (i.e., main radio module) as possible.

That is, the WUR terminal may preferably support various transmission rates for the wake-up packet (WUP) as shown in Table 1 above. For example, different bit values may be allocated for each of a plurality of transmission rates listed in Table 1.

In order to announce the transmission rate of the wake-up packet (WUP), a header of the wake-up packet (WUP) needs to include transmission rate information indicating the transmission rate of the wake-up packet (WUP). In this case, since the number of bits allocated to indicate the transmission rate information increases, overhead of the wake-up packet (WUP) may increase.

When the wake-up packet (WUP) is received, the WUR terminal may change an operation configuration of the WUR module according to the transmission rate information included in the header of the wake-up packet (WUP).

For example, when the WUR terminal receives the wake-up packet (WUP), the WUR terminal may change the operation configuration of the WUR module for receiving the wake-up packet (WUP) based on the transmission rate information.

In most cases, a mobility of the wireless terminal which belongs to the wireless LAN system is not large. That is, whenever the wake-up packet (WUP) is received, the WUR terminal need not change the operation configuration of the WUR module for receiving the wake-up packet (WUP).

As shown in Table 1 above, whenever the wake-up packet (WUP) is transmitted, it may be inefficient to individually indicate a plurality of transmission rates available for transmission of the wake-up packet (WUP).

Specifically, in an environment in which sensors which operate primarily outdoor and do not require a high transmission rate or cellular phone or home appliances which operate primarily indoor and are to use the high transmission rate do not operate a basic service set (BSS), only some of the plurality of transmission rates available for transmission of the wake-up packet (WUP) may be used.

One symbol is required to transfer 1-bit information of the wake-up packet (WUP) due to characteristics of a PHY layer. As a result, reducing the 1-bit information of the wake-up packet (WUP) may be a very important issue in terms of the overhead of the wireless LAN system.

Referring to FIG. 11A, transmission rate information related to a predetermined transmissions type among a plurality of transmission rates (e.g., 31.25 kbps, 62.5 kbps, 125 kbps, 250 kbps, 500 kbps, and 1 mbps of Table 1) available for transmission of the wake-up packet (WUP) may be included in the PCR frame PF as the WUR Rate information element (IE).

Referring to FIG. 11A, the header of the wake-up packet (WUP) may include a transmission type indicator (hereinafter, referred to as 'TTI') indicating any one transmission type of the transmission types.

According to the exemplary embodiment, it may be assumed that only two transmission types may be used between the AP 1100 and the WUR terminal 1110.

For example, the WUR Rate information element (IE) of the PCR frame PF may include first setting information for a first transmission type related to a high transmission rate.

For example, a value indicating any one of 31.25 kbps, 62.5 kbps, 125 kbps, 250 kbps, 500 kbps, and 1 mbps of Table 1 may be set in the first setting information. As one example, it may be assumed that the first setting information may be set to 1 mbps.

For example, the WUR Rate information element (IE) of the PCR frame PF may include second setting information for a second transmission type related to a low transmission rate.

For example, the value indicating any one of 31.25 kbps, 62.5 kbps, 125 kbps, 250 kbps, 500 kbps, and 1 mbps of Table 1 may be set in the second setting information. As one example, the second setting information may be set to 250 kbps.

As another example, the second setting information for the second transmission type related to the low transmission rate may be preset to a default value in the WUR terminal 1110 without separate signaling.

During the PCR interval (TP to TP') of FIG. 11A, the WUR terminal 1110 may operate in the normal mode. In other words, the WUR terminal 1110 which is in the normal mode of FIG. 11A may receive the PCR frame PF based on the main radio module 1111 which is in the activation state (i.e., ON state).

During the PCR interval (TP to TP') of FIG. 11A, the WUR terminal 1110 may acquire information on the transmission rate of the wake-up packet (WUP) for each transmission type in advance based on the WUR Rate information element (IE).

According to the above assumption, the WUR terminal 1110 may acquire information on the transmission rate (i.e., 1 mbps) of the wake-up packet (WUP) for the first transmission type based on the first setting information. Further, the WUR terminal 1110 may acquire information on the transmission rate (i.e., 250 kbps) of the wake-up packet (WUP) for the second transmission type based on the second setting information.

In order to individually indicate the transmission rates of six wake-up packets (WUPs) as shown in Table 1, 3-bit information may be requested in the header of the wake-up packet (WUP).

However, as in the exemplary embodiment, it will be appreciated that when only two transmission types are used between the AP and the WUR terminal, the 1-bit information is requested in the header of the wake-up packet (WUP) in order to individually indicate the transmission rate of the wake-up packet (WUP). Here, the 1-bit information for the transmission type of the wake-up packet (WUP) included in the header of the wake-up packet may be mentioned as a transmission type indicator (TTI).

For example, when the transmission type indicator (TTI) included in the header of the wake-up header (WUP) is '0', the first transmission type for the high transmission rate may be indicated to the WUR terminal 1110.

For example, when the transmission type indicator (TTI) included in the header of the wake-up header (WUP) is '1', the second transmission type for the low transmission rate may be indicated to the WUR terminal 1110.

Detailed contents regarding the WUR Rate information element may be described through FIG. 12 to be described below.

During a subsequent interval (TP' to T1) after transmission of the PCR frame PF of FIG. 11A, the WUR terminal 1110 may operate in the WUR mode.

During the first interval (T1 to T2) of FIG. 11A, the AP 1100 may transmit to the WUR terminal 1110 the wake-up packet (WUP) including the transmission type indicator (TTI). The WUR terminal 1110 according to the exemplary embodiment may decode a payload (e.g., reference numeral 620) of the wake-up packet (WUP) based on the information on the transmission rate of the wake-up packet (WUP) acquired through the transmission type indicator (TTI).

Subsequently, according to the wake-up packet (WUP), the WUR terminal 1110 which is switched from the WUR mode to the normal mode may transmit the PS-poll frame to the AP 1100. In this case, the PS-poll frame may be transmitted by the main radio module 1111 which is in the activation state (i.e., ON state) of the WUR terminal 1110.

When the predetermined time d elapses after receiving the PS-poll frame, the AP 1100 may transmit the ACK frame to the WUR terminal 1110.

Subsequently, the AP 1100 may transmit the downlink data DL DATA packet to the WUR terminal 1110.

When the predetermined time d elapses after receiving the downlink data (DL DATA) packet, the WUR terminal 1100 may transmit the ACK frame to the AP 1100.

Figure 11B:
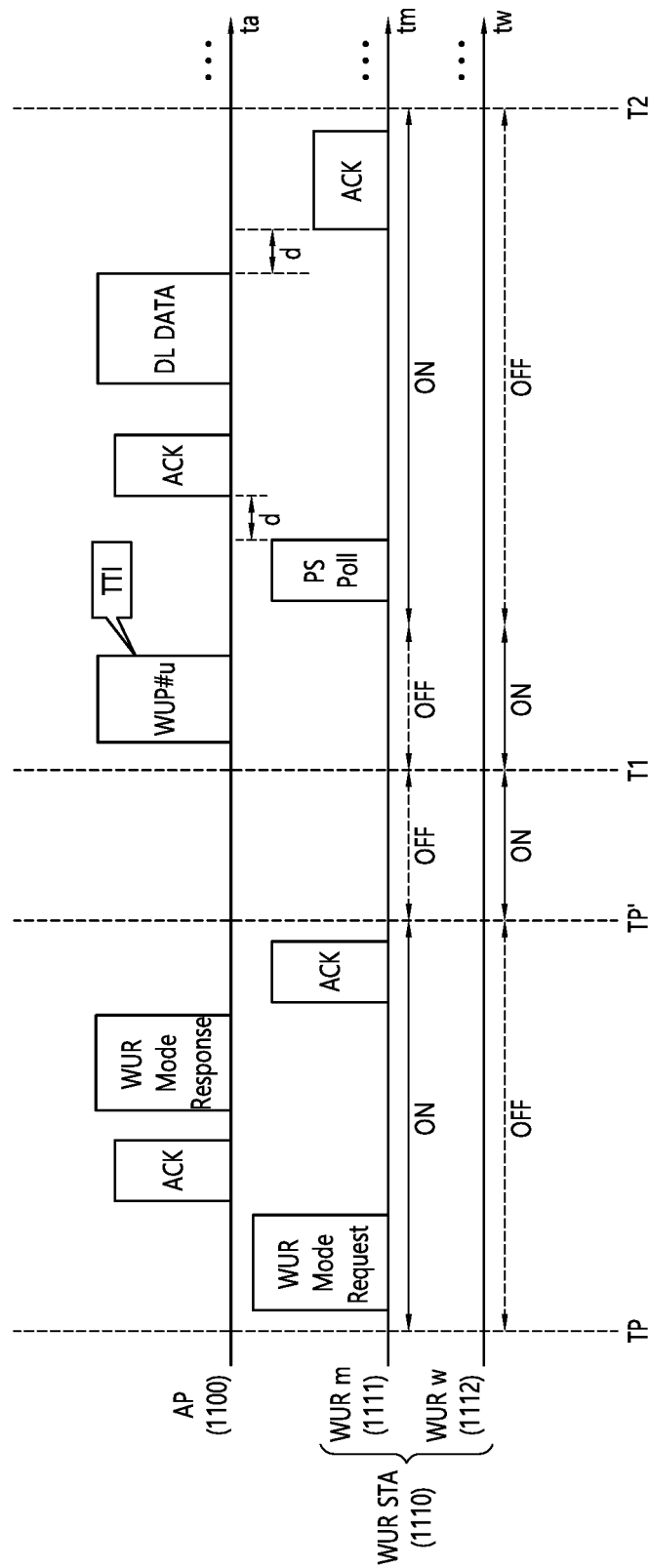

FIG. 11B is a diagram illustrating an operation of receiving a wake-up packet based on transmission rate information according to the exemplary embodiment.

During the PCR interval (TP to TP') of FIG. 11B, the WUR terminal 1110 may transmit a WUR mode request frame to the AP 1100. As one example, the WUR mode request frame may be transmitted by the main radio module 1111 which is in the activation state (i.e., ON state) of the WUR terminal 1111.

The WUR mode request frame of FIG. 11B may include the WUR Rate information element (IE). The WUR mode request frame may be appreciated as a frame for announcing to the AP 1100 that the WUR terminal 1110 is scheduled to operate in the WUR mode. The WUR mode request frame may be appreciated as a frame for requesting the transmission rate of the wake-up packet (WUP) to be received from the viewpoint of the WUR terminal.

Subsequently, the WUR terminal 1110 may receive, from the AP 1100, an ACK frame for announcing successful reception of the WUR mode request frame based on the main radio module 1111 which is in the activation state (i.e., ON state).

Subsequently, the WUR terminal 1110 may receive a WUR mode response frame from the AP 1100. As one example, the WUR mode response frame may be received based on the main radio module 1111 which is in the activation state (i.e., ON state) of the WUR terminal 1111.

The WUR mode response frame of FIG. 11B may include the WUR Rate information element (IE). The WUR mode response frame may be appreciated as a frame for permitting the WUR terminal 1110 to operate in the WUR mode. The WUR mode response frame may be appreciated as a frame for announcing the transmission rate of the wake-up packet (WUP) determined by the AP.

The PCR interval (TP to TP') of FIG. 11B is illustrated with respect to a relationship between one AP and one WUR terminal, but it will be appreciated that this specification is not limited thereto.

In other words, during the PCR interval (TP to TP') of FIG. 11B, it will be appreciated that the WUR mode request frame and the WUR mode response frame may be individually exchanged between one AP and a plurality of WUR terminals.

It will be appreciated that description of the remaining intervals (TP' to T1 and T1 to T2) of FIG. 11B may be replaced with contents described above in FIG. 11A.

Figure 12:
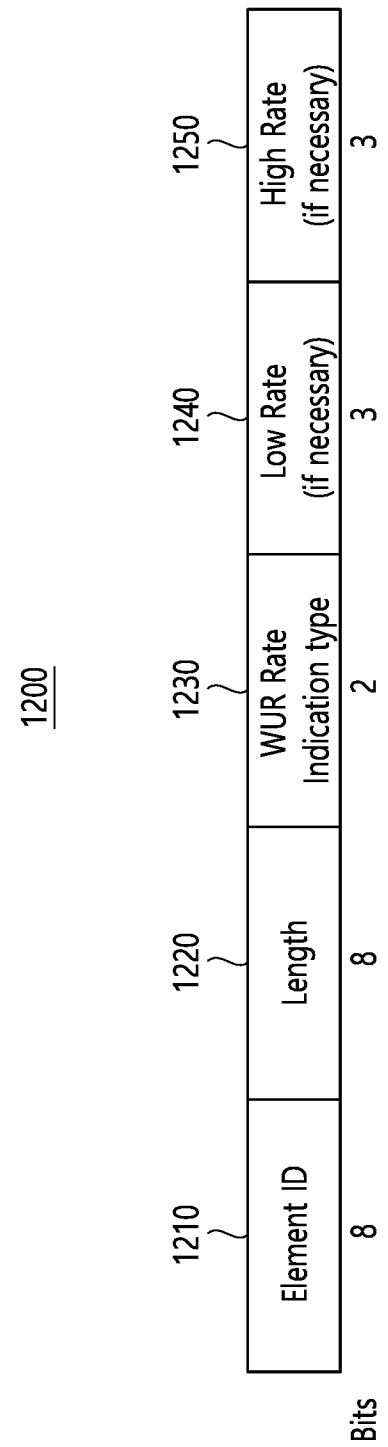
FIG. 12 is a diagram illustrating a format of an information element for transmission rate information according to an exemplary embodiment.

FIG. 12 is a diagram illustrating a format of an information element for transmission rate information according to an exemplary embodiment. Referring to FIG. 12, a WUR Rate information element 1200 may include a plurality of fields 1210, 1220, 1230, 1240, and 1250.

For example, the WUR Rate information element 1200 may be included in the PCR frame PF exchanged in the association procedure between the WUR terminal and the AP. Specifically, when the transmission rate of the wake-up packet (WUP) needs to be changed, the WUR Rate information element 1200 may be included in the beacon frame periodically transmitted by the AP.

An element ID field 1210 may include information for indicating the WUR Rate information element 1200 among various information elements included in the PCR frame PE. For example, 1 octet (i.e., 8 bits) may be allocated for the element ID field 1210.

A length field 1220 may include information indicating the total number of bits allocated for the WUR Rate information element 1200. For example, 1 octet (i.e., 8 bits) may be allocated for the length field 1220.

2 bits may be allocated for a WUR Rate indication type field 1230. For example, the WUR Rate indication type field 1230 may be set as shown in Table 2 below.

TABLE 2

| WUR Rate indication type field | WUR Rate information |
|---|---|
| 00 | Reserved |
| 01 | Low Rate |
| 10 | High Rate |
| 11 | Low rate and High rate |

For example, when the WUR Rate indication type field 1230 is set to '01', it may be indicated that the first setting information for the first transmission type related to the high transmission rate is included behind the WUR Rate indication type field 1230.

For example, when the WUR Rate indication type field 1230 is set to '10', it may be indicated that the second setting information for the second transmission type related to the low transmission rate is included behind the WUR Rate indication type field 1230.

For example, when the WUR Rate indication type field 1230 is set to '11', it may be indicated that the first setting information for the transmission type related to the high transmission rate and the second setting information for the transmission type related to the low transmission rate are included behind the WUR Rate indication type field 1230.

For example, when the WUR Rate indication type field 1230 is set to '00', it may be indicated that reserved information is included behind the WUR Rate indication type field 1230.

A Low Rate field 1240 may include the setting information for the transmission type related to the low transmission rate. For example, 3 bits may be allocated for the Low Rate field 1240. For example, the Low Rate field 1240 may include information indicating any one of six transmission rates shown in Table 6 above.

A High Rate field 1250 may include the setting information for the transmission type related to the high transmission rate. For example, 3 bits may be allocated for the High Rate field 1250. For example, the High Rate field 1250 may include information indicating any one of six transmission rates shown in Table 6 above.

It will be appreciated that only some of the plurality of fields illustrated in FIG. 12 may be included in the WUR Rate information element 1200. For example, the WUR Rate information element 1200 may include only the High Rate field 1250 without the Low Rate field 1240.

When the WUR Rate information element 1200 is transmitted from the AP to the WUR terminal, the WUR Rate information element 1200 may be appreciated to announce the transmission rate information for the transmission type of the wake-up packet (WUP) for the WUR terminal to the WUR terminal.

When the WUR Rate information element 1200 is transmitted from the WUR terminal to the AP, the WUR Rate information element 1200 may be appreciated to request the transmission rate information for the transmission type of the wake-up packet (WUP) for the WUR terminal to the AP.

Figure 13:
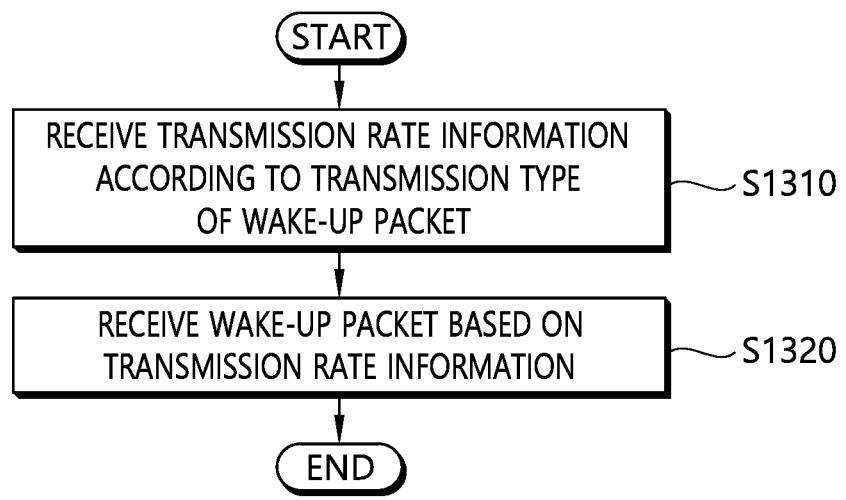
FIG. 13 is a flowchart for a method for receiving a wake-up packet based on transmission rate information according to an exemplary embodiment.

FIG. 13 is a flowchart for a method for receiving a wake-up packet based on transmission rate information according to an exemplary embodiment.

Referring to FIGS. 1 to 13, a first wireless terminal mentioned in FIG. 13 may correspond to the WUR terminal (e.g., reference numeral 1110 of FIG. 11). A second wireless terminal mentioned in FIG. 13 may correspond to the AP (e.g., reference numeral 1100 of FIG. 11).

In step S1310, the first wireless terminal may receive, from the second wireless terminal, the transmission rate information for the transmission type of the wake-up packet (WUP).

For example, when the wake-up packet (WUP) is transmitted as the first transmission type, the transmission rate for the wake-up packet (WUP) may be mentioned as the first transmission rate corresponding to the high transmission rate.

As another example, when the wake-up packet (WUP) is transmitted as the second transmission type, the transmission rate for the wake-up packet (WUP) may be mentioned as the second transmission rate corresponding to the low transmission rate.

Further, the transmission rate information for the transmission type of the wake-up packet (WUP) may be set based on at least three transmission rates available for transmission of the wake-up packet (WUP).

For example, at least three transmission rates may be associated among six transmission rates (i.e., 31.25 kbps, 62.5 kbps, 125 kbps, 250 kbps, 500 kbps, and 1 mbps) listed in Table 1 above.

When the number of transmission rates available for transmission of the wake-up packet (WUP) is three (e.g., 31.25 kbps, 125 kbps, 500 kbps) or four (e.g., 62.5 kbps, 250 kbps, 500 kbps, and 1 mbps), 2-bit information may be requested to indicate one transmission rate for the transmission type of the wake-up packet (WUP).

When the number of transmission rates available for transmission of the wake-up packet (WUP) is five (e.g., 31.25 kbps, 62.5 kbps, and 125 kbps, 250 kbps, 500 kbps) or sixth (e.g., 31.25 kbps, 62.5 kbps, 125 kbps, 250 kbps, 500 kbps, and 1 mbps), 3-bit information may be requested to indicate one transmission rate for the transmission type of the wake-up packet (WUP).

According to the exemplary embodiment, the WUR Rate information element included in the PCR frame PF may include the first setting information for setting any one of at least three transmission rates to the first transmission rate.

That is, the first wireless terminal may acquire information on the transmission rate of the wake-up packet (WUP) for the first transmission type in advance based on the WUR Rate information element.

Further, the WUR Rate information element included in the PCR frame PF may include the second setting information for setting any one of at least three transmission rates to the second transmission rate.

That is, the first wireless terminal may acquire information on the transmission rate of the wake-up packet (WUP) for the second transmission type in advance based on the WUR Rate information element. EKS, i.e., information on the second transmission rate lower than the first transmission rate may be set to a default value for the first wireless terminal without separate signaling.

Further, the transmission rate information may be received based on the main radio module included in the first wireless terminal.

In step S1320, the first wireless terminal may receive the wake-up packet (WUP) from the second wireless terminal based on the transmission rate information. Here, the wake-up packet (WUP) may be received according to the unicast technique.

For example, the header of the wake-up packet (WUP) may include the transmission type indicator (TTI) for the transmission type of the wake-up packet (WUP). That is, the wake-up packet (WUP) may be received based on the WUR module included in the first wireless terminal. The wake-up packet (WUP) may be appreciated as a packet modulated according to the On-Off Keying (OOK) technique.

For example, when the transmission type indicator (TTI) of the wake-up packet (WUP) indicates the first transmission type, the first wireless terminal may receive the wake-up packet (WUP) from the second wireless terminal according to the first transmission rate.

As another example, when the transmission type indicator (TTI) of the wake-up packet (WUP) indicates the second transmission type, the first wireless terminal may receive the wake-up packet (WUP) from the second wireless terminal according to the second transmission rate.

According to the exemplary embodiment, the transmission rate information for the transmission type of the wake-up packet (WUP) may be included in the PCR frame PF and acquired in advance through the main radio module of the wireless terminal.

Subsequently, the wireless terminal may receive the wake-up packet (WUP) based on the transmission type indicator (TTI) included in the header of the wake-up packet (WUP). In this case, the wake-up packet (WUP) may be received through the WUR module of the wireless terminal.

Consequently, even though only the transmission type of the wake-up packet (WUP) is indicated based on the transmission type indicator (TTI), the wireless terminal may successfully receive the wake-up packet (WUP) based on the previously acquired transmission rate information.

According to the exemplary embodiment, since the number of bit information included in the wake-up packet (WUP) may be reduced, the overhead of the wireless LAN system may be reduced. Accordingly, according to the exemplary embodiment, performance of the wireless LAN system may be enhanced.

Figure 14:
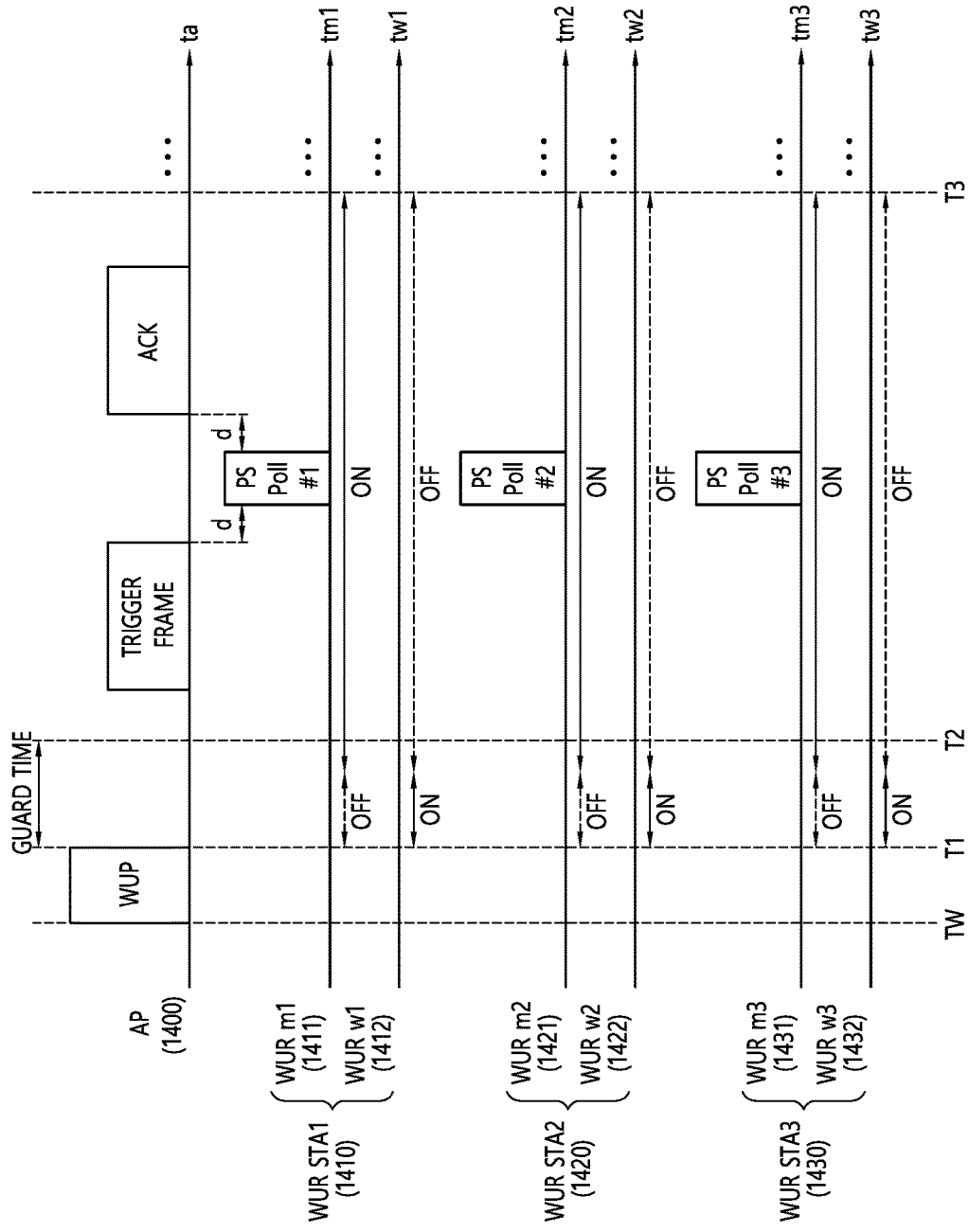
FIG. 14 is a diagram illustrating an operation of a low-power mode performed based on a wake-up packet according to a multicast technique according to an exemplary embodiment.

FIG. 14 is a diagram illustrating an operation of a low-power mode performed based on a wake-up packet according to a multicast technique according to an exemplary embodiment.

Referring to FIG. 14, a horizontal axis of an access point (AP) 1400 may indicate a time to and a vertical axis may be associated with presence of a frame to be transmitted by the AP 1400.

A first WUR terminal 1410 may include a first main radio module (WUR m1) 1411 and a first WUR module (WUR w1) 1412. For example, the main radio module 1411 may correspond to the main radio module 511 of FIG. 5. The WUR module 1412 may correspond to the WUR module 512 of FIG. 5.

The horizontal axis of the first main radio module 1411 may indicate a time tm1. Further, an arrow to be shown below the horizontal axis of the first main radio module 1411 may indicate a power state (e.g., the ON state or OFF state) of the first main radio module 1411. The vertical axis of the first main radio module 1411 may be associated with presence of the frame to be transmitted by the first main radio module 1411.

The horizontal axis of the first WUR module 1412 may indicate a time tw1. Further, an arrow to be shown below the horizontal axis of the first WUR module 1412 may indicate the power state (e.g., the ON state or OFF state) of the first WUR module 1412. The vertical axis of the first WUR module 1412 may be associated with presence of the frame to be transmitted by the first WUR module 1412.

A second WUR terminal 1420 may include a second main radio module (WUR m2) 1421 and a second WUR module (WUR w2) 1422. For example, the second main radio module 1421 may correspond to the main radio module 511 of FIG. 5. The second WUR module 1422 may correspond to the WUR module 512 of FIG. 5.

The horizontal axis of the second main radio module 1421 may indicate a time tm2. Further, an arrow to be shown below the horizontal axis of the second main radio module 1421 may indicate a power state (e.g., the ON state or OFF state) of the second main radio module 1422. The vertical axis of the second main radio module 1422 may be associated with presence of the frame to be transmitted by the second main radio module 1422.

The horizontal axis of the second WUR module 1422 may indicate a time tw2. Further, an arrow to be shown below the horizontal axis of the second WUR module 1422 may indicate the power state (e.g., the ON state or OFF state) of the second WUR module 1422. The vertical axis of the second WUR module 1422 may be associated with presence of the frame to be transmitted by the second WUR module 1422.

A third WUR terminal 1430 may include a third main radio module (WUR m3) 1431 and a third WUR module (WUR w3) 1432. For example, the third main radio module 1431 may correspond to the main radio module 511 of FIG. 5. The third WUR module 1432 may correspond to the WUR module 512 of FIG. 5.

The horizontal axis of the third main radio module 1431 may indicate a time tm3. Further, an arrow to be shown below the horizontal axis of the third main radio module 1431 may indicate the power state (e.g., the ON state or OFF state) of the third main radio module 1431. The vertical axis of the third main radio module 1431 may be associated with presence of the frame to be transmitted by the third main radio module 1431.

The horizontal axis of the third WUR module 1432 may indicate a time tw3. Further, an arrow to be shown below the horizontal axis of the third WUR module 1432 may indicate the power state (e.g., the ON state or OFF state) of the third WUR module 1432. The vertical axis of the third WUR module 1432 may be associated with presence of the frame to be transmitted by the third WUR module 1432.

In FIG. 14, it is illustrated that a plurality of WUR terminals corresponds to the first WUR terminal 1410 to the third WUR terminal 1430. However, it will be appreciated that this specification is not limited thereto.

The first to third WUR terminals 1410, 1420, and 1430 may be appreciated as wireless terminals associated with the AP through a predetermined association procedure.

It may be assumed that during an wake-up interval (TW to T1) of FIG. 14, the first main radio module 1411 of the first WUR terminal 1410 is in the deactivation state (i.e., OFF state) and the first WUR terminal 1412 is in the turn-on state (i.e., ON state).

It may be assumed that the second main radio module 1421 of the second WUR terminal 1420 is in the deactivation state (i.e., OFF state) and the second WUR terminal 1422 is in the turn-on state (i.e., ON state).

Further, it may be assumed that the third main radio module 1431 of the third WUR terminal 1430 is in the deactivation state (i.e., OFF state) and the third WUR terminal 1432 is in the turn-on state (i.e., ON state).

During the wake-up interval (TW to T1) of FIG. 14, the AP 1400 may transmit the wake-up packet (hereinafter, referred to as 'WUP'). For example, the wake-up packet (WUP) of FIG. 14 may indicate the plurality of main radio modules (e.g., 1421, 1422, and 1423) included in the plurality of WUR terminals 1410, 1420 and 1430 to enter the activation state according to the multicast technique.

As another example, the wake-up packet (WUP) may indicate all main radio modules corresponding to all WUR terminals receiving the wake-up packet (WUP) to entire the activation state according to the broadcast scheme.

The wake-up packet (WUP) of FIG. 14 may include a first payload modulated according to the on-off keying (OOK) technique for the first WUR module 1412. For example, the first payload may be generated based on an ON signal determined as a 1-bit ON signal by the first WUR module 1412 and an OFF signal determined as a 1-bit OFF signal by the first WUR module 1412.

The first payload mentioned in FIG. 1 may be transmitted based on first sub-channels which belong to a channel band (e.g., 20 MHz) corresponding to N (e.g., 64) subcarriers. The first sub-channels may be implemented based on N1 (e.g., 13) subcarriers among N (e.g., 64) subcarriers.

As one example, the ON signal included in the first payload may be acquired by performing Inverse Fast Fourier Transform (IFFT) with respect to N1 (e.g., 13) subcarriers among N (e.g., 64) subcarriers corresponding to the channel band of the wake-up packet (WUP).

Further, the wake-up packet (WUP) may include a second payload modulated according to the OOK technique for the second WUR module 1422. For example, the second payload may be generated based on an ON signal determined as a 1-bit ON signal by the second WUR module 1422 and an OFF signal determined as a 1-bit OFF signal by the second WUR module 1422.

The second payload mentioned in FIG. 2 may be transmitted based on second sub-channels which belong to a channel band (e.g., 20 MHz) corresponding to N (e.g., 64) subcarriers. The second sub-channels may be implemented based on N2 (e.g., 13) subcarriers among N (e.g., 64) subcarriers. In this case, N2 (e.g., 13) subcarriers may not overlap with N1 (e.g., 13) subcarriers.

Further, the wake-up packet (WUP) may include a third payload modulated according to the OOK technique for the third WUR module 1432. For example, the third payload may be generated based on an ON signal determined as a 1-bit ON signal by the third WUR module 1432 and an OFF signal determined as a 1-bit OFF signal by the third WUR module 1432.

The third payload mentioned in FIG. 3 may be transmitted based on third sub-channels which belong to the channel band (e.g., 20 MHz) corresponding to N (e.g., 64) subcarriers. The third sub-channels may be implemented based on N3 (e.g., 13) subcarriers among N (e.g., 64) subcarriers. In this case, N3 (e.g., 13) subcarriers of the third sub-channel may not overlap with N2 (e.g., 13) subcarriers of the second sub-channel.

According to this specification, a delay time required until the main radio modules 1411, 1421, and 1431 enters the activation state (i.e., ON state) according to the wake-up signal (e.g., reference numeral 523 of FIG. 5) which is a primitive signal generated in the WUR terminal based on the received wake-up packet (WUP) may be mentioned as a Turn-On Delay (hereinafter, referred to as 'TOD').

A guide time may be introduced in order to reduce the occurrence of unnecessary overhead and delay caused by a mismatch in power state between the AP and the WUR terminal due to the TOD.

The guard time for the wake-up packet (WUP) may be appreciated as a first interval (T1 to T2) of FIG. 14. In this case, the first interval (T1 to T2) of FIG. 14 may be set according to a predetermined parameter for the guard time.

For example, a predetermined parameter may be an individually set value in the association procedure between the AP 1400 and each WUR STA (e.g., 1410, 1420, or 1430) for the guard time. As one example, the guard time set in the first to third WUR terminals 1410, 1420, and 1430 of FIG. 14 may be configured to have the same time interval (e.g., T1 to T2 of FIG. 14).

The AP 1400 may wait without transmitting any packet until the first interval (T1 to T2) of FIG. 14 corresponding to the guard time elapses.

For simple and clear description of the exemplary embodiment, it may be assumed that each WUR terminal 1410, 1420, or 1430 is switched from the WUR mode to the normal mode before the first interval (e.g., T1 to T2) corresponding to the guard time elapses.

During the second interval (T2 to T3) of FIG. 14, the AP 1400 may transmit a trigger frame in order to check whether to successfully receive the wake-up packet (WUP) to each WUR terminal. The trigger frame may be a frame transmitted based on a contention for a radio channel.

The trigger frame mentioned in this specification may be appreciated as a frame for triggering a plurality of uplink transmission from a plurality of terminals. The trigger frame may include identification information for the plurality of terminals and frequency resource information allocated to each terminal. More detailed contents regarding the trigger frame mentioned in this specification may be described with reference to section 9.3.1.23 of a standard document IEEE P802.11ax/D2.1 disclosed in January 2018.

During the second interval (T2 to T3) of FIG. 14, the plurality of WUR terminals 1410, 1420, and 1430 may transmit a plurality of Power Save (PS)-Poll frames on an overlapped time resource in response to the trigger frame.

The plurality of PS-poll frames may be individually transmitted based on the main radio modules 1411, 1421, and 1431 included in the respective WUR terminals 1410, 1420, and 1430. The plurality of PS-poll frames may be frames transmitted when the predetermined time d elapses. In this case, the predetermined time d may be SIFS.

A first PS-poll (PS Poll #1) frame is transmitted to the AP 1400 in response to the trigger frame, and as a result, the first WUR terminal 1410 may announce to the AP 1400 that the first main radio module 1411 enters the activation state (i.e., ON state) based on the received wake-up packet (WUP). For example, the first PS-poll (PS Poll #1) frame may be transmitted through a first resource unit allocated to the first WUR terminal 1410.

That is, when the first PS-poll (PS Poll #1) frame is received, the AP 1400 may determine that the wake-up packet (WUP) is successfully received by the first WUR terminal 1410.

A second PS-poll (PS Poll #2) frame is transmitted to the AP 1400 in response to the trigger frame, and as a result, the second WUR terminal 1420 may announce to the AP 1420 that the second main radio module 1421 enters the activation state (i.e., ON state) based on the received wake-up packet (WUP). For example, the second PS-poll (PS Poll #2) frame may be transmitted through a second resource unit allocated to the second WUR terminal 1420.

That is, when the second PS-poll (PS Poll #2) frame is received, the AP 1400 may determine that the wake-up packet (WUP) is successfully received by the second WUR terminal 1420.

A third PS-poll (PS Poll #3) frame is transmitted to the AP 1400 in response to the trigger frame, and as a result, the third WUR terminal 1430 may announce to the AP 1431 that the third main radio module 1431 enters the activation state (i.e., ON state) based on the received wake-up packet (WUP). For example, the third PS-poll (PS Poll #3) frame may be transmitted through a third resource unit allocated to the third WUR terminal 1430.

That is, when the third PS-poll (PS Poll #3) frame is received, the AP 1400 may determine that the wake-up packet (WUP) is successfully received by the third WUR terminal 1430.

Subsequently, in order to announce successful reception of the first to third PS-poll (PS Poll #3) frames, the AP 1400 may transmit the acknowledgement (ACK) frame when the predetermined time d elapses after receiving the first to third PS-poll (PS Poll #3) frames. In this case, the predetermined time d may be SIFS.

For example, the ACK frame of FIG. 14 may be received by the respective WUR terminals 1410, 1420, and 1430 based on the first to third main radio modules 1411, 1421, and 1431 in the activation state (i.e., ON state).

Figure 15A:
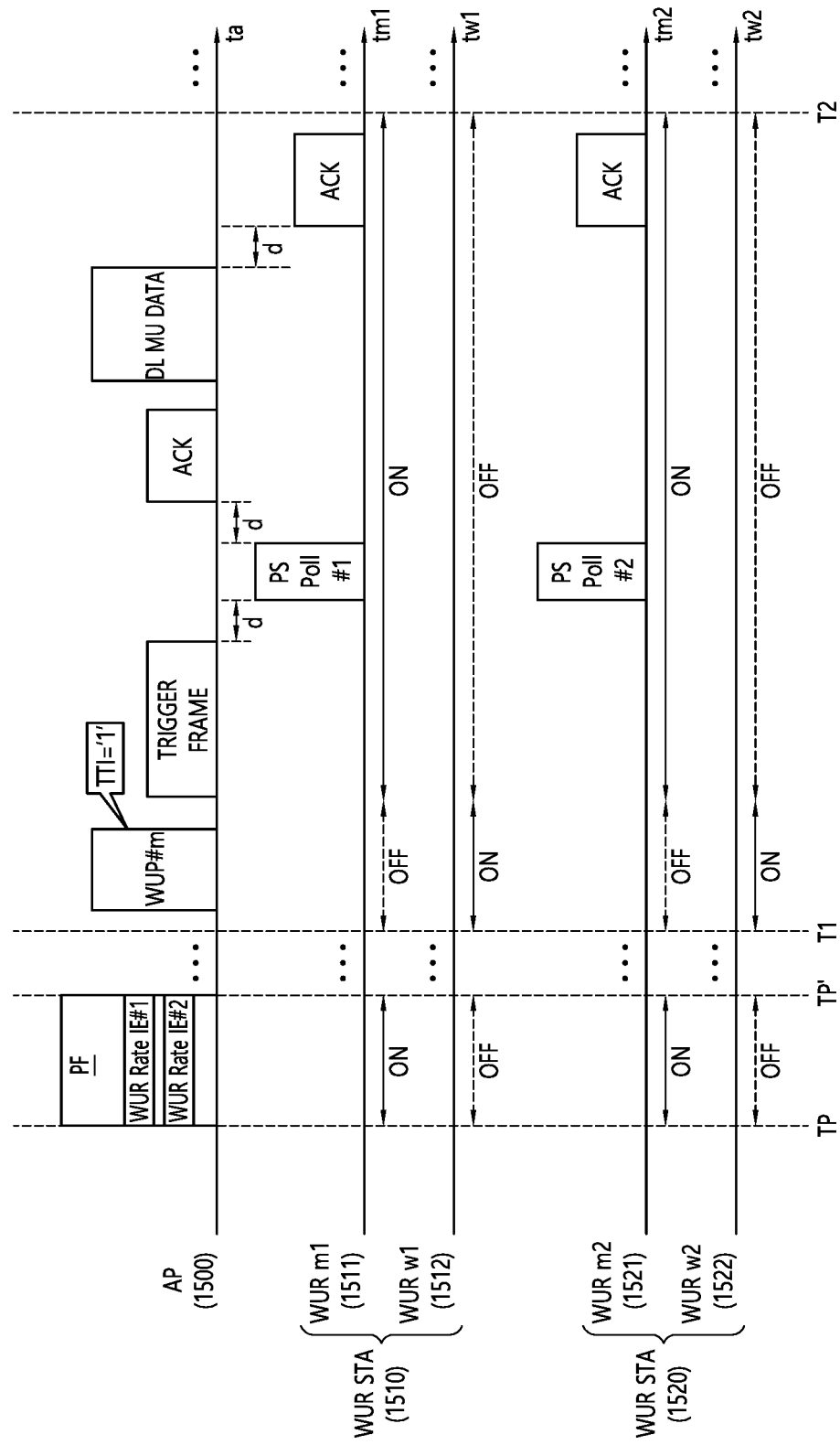
FIGS. 15A and 15B are diagrams illustrating an operation of a low-power mode performed based on a wake-up packet according to a unicast technique and a wake-up packet according to a multicast technique according to an exemplary embodiment.
Figure 15B:
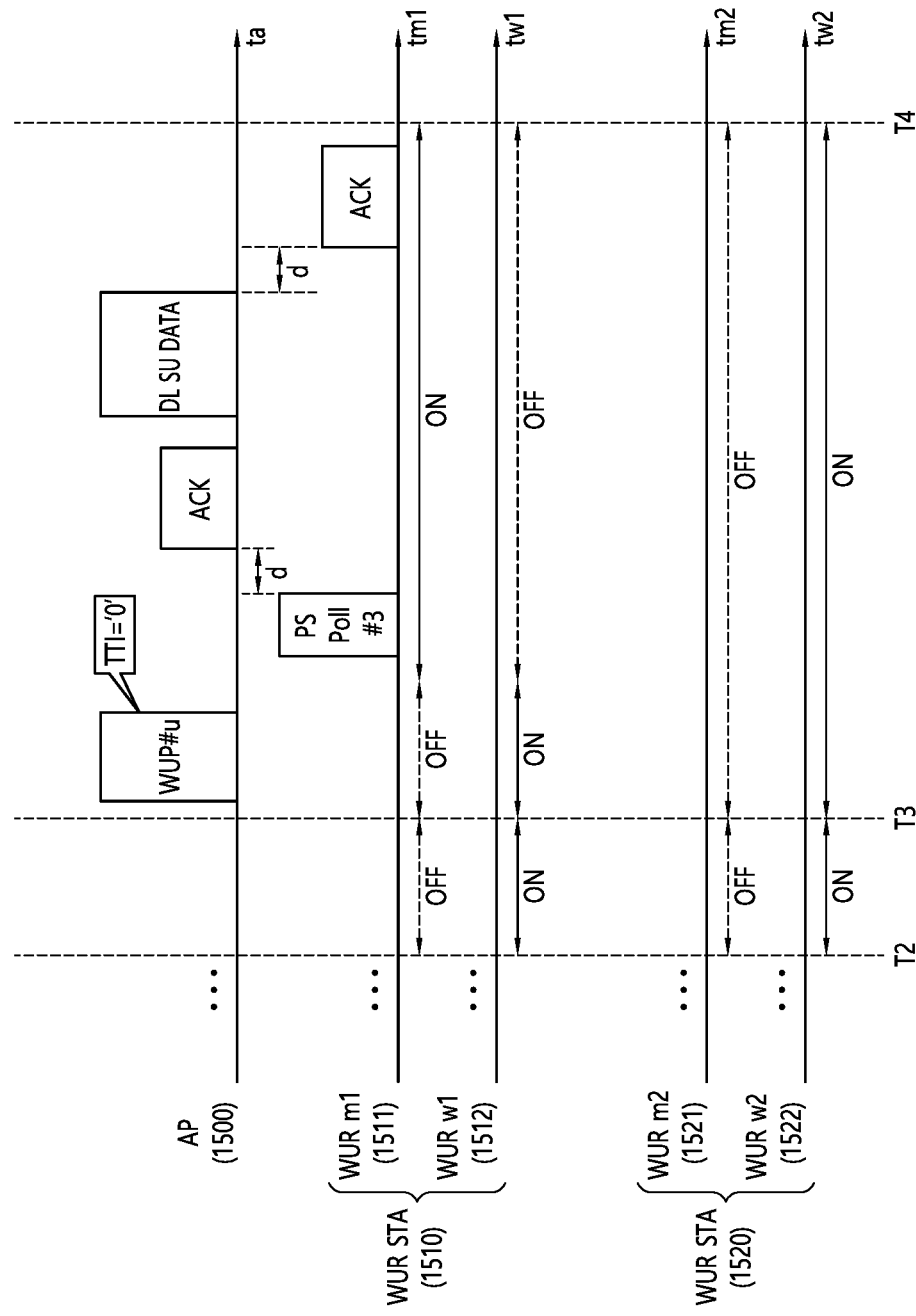

FIGS. 15A and 15B are diagrams illustrating an operation of a low-power mode performed based on a wake-up packet according to a unicast technique and a wake-up packet according to a multicast technique according to an exemplary embodiment.

Referring to FIG. 1 to FIGS. 15A and 15B, the first WUR terminal 1510 and the second WUR terminal 1520 of FIG. 15 may be appreciated as terminals associated through a previously performed association procedure with the AP 1,500.

For clear and simple description of FIGS. 15A and 15B, it may be assumed that low transmission rates of the wake-up packet (WUP) for the plurality of WUR terminals which belong to the same BSS are set to the same value.

According to the above assumption, information on a second transmission rate which is a transmission rate lower than a first transmission rate may be set to a default value in the plurality of WUR terminals 1510 and 1520 without separate signaling. As one example, the second transmission rates for the plurality of WUR terminals 1510 and 1520 may be set to the same initial value (i.e., 62.5 kbps).

For example, the first transmission rate may be used for transmission of a wake-up packet WUP #u according to the unicast technique for each WUR terminal. That is, a first transmission type of wake-up packet (WUP) may be transmitted according to the first transmission rate.

For example, the second transmission rate may be used for transmission of a wake-up packet WUP #m according to the multicast technique for the plurality of WUR terminals. That is, a second transmission type of wake-up packet (WUP) may be transmitted according to the second transmission rate.

As another example, the second transmission rate may be used when a transmission failure of the wake-up packet WUP #u according to the unicast technique consecutively occurs.

Referring to FIG. 15A, during a PCR interval (TP to TP') of FIG. 15A, the AP 1,500 may transmit the PCR frame. For example, the PCR frame PF may be appreciated as the beacon frame transmitted according to the broadcast technique or the multicast technique for a plurality of WUR terminals 1510 and 1520 associated with the AP 1,500.

According to the exemplary embodiment, the PCR frame PF of FIG. 15A may include a plurality of WUR Rate information elements WUR Rate IE #1 and WUR Rate IE #2.

In FIG. 15A, only two WUR Rate information elements WUR Rate IE #1 and WUR Rate IE #2 for two WUR terminals are illustrated, but it will be appreciated that this specification is not limited to one example of FIG. 15A.

For example, the first WUR Rate information element WUR Rate IE #1 may be appreciated as an information element for the first WUR terminal 1510. As one example, the first WUR Rate information element WUR Rate IE #1 of FIG. 15A may include only some (e.g., 1210, 1220, 1230, and 1250) of the plurality of fields illustrated in FIG. 12 above.

According to the above assumption, the first WUR Rate information element WUR Rate IE #1 may include only information on the first transmission rate (e.g., 500 kbps) of the wake-up packet (WUP) for the first WUR terminal 1510.

The second WUR Rate information element WUR Rate IE #2 may be appreciated as an information element for the second WUR terminal 1520. As one example, the second WUR Rate information element WUR Rate IE #2 of FIG. 15A may include only some (e.g., 1210, 1220, 1230, and 1250) of the plurality of fields illustrated in FIG. 12 above.

According to the above assumption, the second WUR Rate information element WUR Rate IE #2 may include only information on the first transmission rate (e.g., 125 kbps) of the wake-up packet (WUP) for the second WUR terminal 1520.

During the PCR interval (TP to TP') of FIG. 15A, the respective WUR terminals 1510 and 1520 may operate in the normal mode. Accordingly, the PCR frame PF may be received by the main radio modules 1511 and 1512 which is in the activation state (i.e., ON state), which are included in the respective WUR terminals 1511 and 1512.

During the PCR interval (TP to TP') of FIG. 15A, the first WUR terminal 1510 may acquire information on the first transmission rate (i.e., 500 kbps) of the wake-up packet (WUP_for the first WUR terminal 1510 according to the first WUR Rate information element WUR Rate IE #1.

For example, it may be assumed that the wake-up packet WUP #u according to the unicast technique for the first WUR terminal 1510 is received. In this case, when the transmission type indicator (TTI) included in the header of the wake-up packet WUP #u indicates the first transmission type (e.g., when the TTI is set to '1'), the first WUR terminal 1510 may receive the wake-up packet WUP #u based on the information on the first transmission rate (i.e., 500 kbps).

For example, it may be assumed that the wake-up packet WUP #m according to the multicast technique for the plurality of WUR terminals is received. In this case, when the transmission type indicator (TTI) included in the header of the wake-up packet WUP #u indicates the second transmission type (e.g., when the TTI is set to '0'), the first WUR terminal 1510 may receive the wake-up packet WUP #m based on the information on the second transmission rate (i.e., 62.5 kbps).

During the PCR interval (TP to TP') of FIG. 15A, the second WUR terminal 1520 may acquire from the AP 1,500 information on the first transmission rate (i.e., 125 kbps) of the wake-up packet (WUP) for the second WUR terminal 1520 according to the second WUR Rate information element WUR Rate IE #2.

For example, it may be assumed that the wake-up packet WUP #u according to the unicast technique for the second WUR terminal 1520 is received. In this case, when the transmission type indicator (TTI) included in the header of the wake-up packet WUP #u indicates the first transmission type (e.g., when the TTI is set to '1'), the second WUR terminal 1520 may receive the wake-up packet WUP #u based on the information on the first transmission rate (i.e., 125 kbps).

For example, it may be assumed that the wake-up packet WUP #m according to the multicast technique for the plurality of WUR terminals is received. In this case, when the transmission type indicator (TTI) included in the header of the wake-up packet WUP #u indicates the second transmission type (e.g., when the TTI is set to '0'), the second WUR terminal 1520 may receive the wake-up packet WUP #m based on the information on the second transmission rate (i.e., 62.5 kbps).

For clear and simple description of FIG. 15A, it may be assumed that at a start time T1 of the first interval (T1 to T2) of FIG. 15A, the first WUR terminal 1510 and the second WUR terminal 1520 are in the WUR mode.

During the first interval (T1 to T2) of FIG. 15A, the AP 1,500 may transmit the wake-up packet WUP #m according to the multicast technique. For example, a receiving terminal of the wake-up packet WUP #m may be appreciated as the first WUR terminal 1510 and the second WUR terminal 1520.

Referring to FIG. 15A, the transmission type indicator (TTI) of the wake-up packet WUP #m according to the multicast technique may be set to '1'. As a result, the first WUR terminal 1510 and the second WUR terminal 1520 may receive the wake-up packet WUP #m based on the information on the second transmission rate (i.e., 62.5 kbps).

When the wake-up packet WUP #m according to the multicast technique is received, the first WUR terminal 1510 and the second WUR terminal 1520 may be switched from the WUR mode to the normal mode as shown in the first interval (T1 to T2) of FIG. 15A.

Subsequently, the AP 1,500 may transmit the trigger frame. It will be appreciated that description of the trigger frame of FIG. 15A may be replaced with the description of the trigger frame of FIG. 14 above.

Subsequently, the plurality of WUR terminals 1510 and 1520 may transmit the plurality of PS-poll frames (e.g., PS Poll #1 and PS Poll #2) in response to the trigger frame. It will be appreciated that description of the plurality of PS-poll frames of FIG. 15A may be replaced with the description of the plurality of PS-poll frames of FIG. 14 above.

Subsequently, the AP 1,500 may receive the ACK frame in response to the plurality of PS-poll frames (e.g., PS Poll #1 and PS Poll #2). It will be appreciated that description of the ACK frame of FIG. 15A may be replaced with the description of the ACK frame of FIG. 14 above.

Subsequently, the AP 1,500 may transmit downlink data (downlink multi-user data, hereinafter, referred to as 'DL MU DATA') buffered for the plurality of WUR terminals. The downlink data (DL MU DATA) buffered for the plurality of WUR terminals 1510 and 1520 may be received based on the main radio modules 1511 and 1521 in the activation state (i.e., ON state), which are included in the plurality of WUR terminals 1510 and 1520, respectively.

Subsequently, each of the plurality of WUR terminals 1510 and 1520 may transmit the ACK frame to the AP 1,500 in response to the downlink data (DL MU DATA) buffered for the plurality of WUR terminals 1510 and 1520.

Referring to FIG. 15B, during the second interval (T2 to T3) of FIG. 15B, the respective WUR terminals 1510 and 1520 may b switched to the WUR mode again.

During the third interval (T3 to T4) of FIG. 15B, the AP 1,500 may transmit the wake-up packet WUP #m for the first WUR terminal 1510 according to the unicast technique. In this case, the transmission type indicator (TTI) of the wake-up packet WUP #m for the first WUR terminal 1510 may be set to '0'. As a result, the first WUR terminal 1510 may receive the wake-up packet WUP #m based on the information on the first transmission rate (i.e., 500 kbps).

Although not illustrated in FIG. 15B, when the transmission type indicator (TTI) of the wake-up packet WUP #u for the second WUR terminal 1520 is set to '0', the second WUR terminal 1520 may receive the wake-up packet WUP #u based on the information on the first transmission rate (i.e., 125 kbps).

During the third interval (T3 to T4) of FIG. 15B, when the wake-up packet WUP #u according to the unicast technique for the first WUR terminal 1510 is received, the first WUR terminal 1510 may be switched from the WUR mode to the normal mode.

After the first WUR terminal 1510 is switched to the normal mode, the first WUR terminal 1510 may transmit the third PS-poll frame PS Poll #3 for announcing that the first WUR terminal 1510 enters the normal mode to the AP 1,500. In this case, the third PS-poll frame PS Poll #3 may be transmitted by the main radio module 1511 of the first WUR terminal 1510 which is in the activation state (i.e., ON state).

Subsequently, the AP 1,500 may receive the ACK frame for announcing successful reception of the third PS-poll frame PS Poll #3. In this case, the ACK frame may be received based on the main radio module 1511 of the first WUR terminal 1510 which is in the activation state (i.e., ON state).

Subsequently, the AP 1,500 may transmit downlink data (downlink single-user data, hereinafter, referred to as 'DL SU DATA') buffered for the first WUR terminal 1510. The downlink data (DL SU DATA) buffered for the first WUR terminal 1510 may be received based on the main radio module 1511 in the activation state (i.e., ON state), which is included in the first WUR terminal 1510.

Subsequently, the first WUR terminal 1510 may transmit to the AP 1,500 the ACK frame for successful reception of the downlink data (DL SU DATA) buffered for the first WUR terminal 1510.

Meanwhile, during the third interval (T3 to T4) of FIG. 15B, the second WUR terminal 1510 may maintain the WUR mode.

Figure 16:
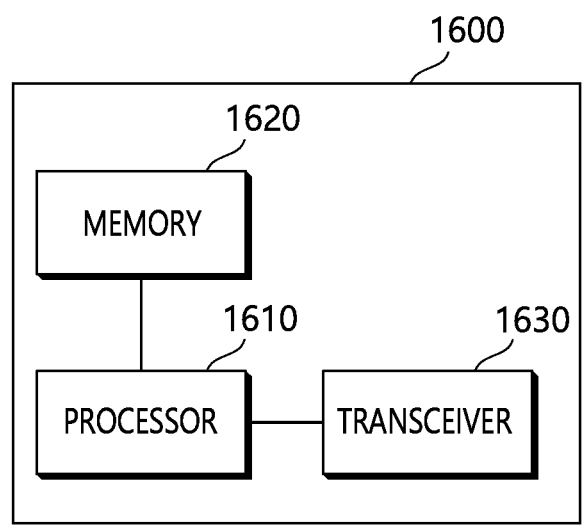
FIG. 16 is a block diagram illustrating a wireless apparatus to which an exemplary embodiment may be applied.

FIG. 16 is a block diagram illustrating a wireless apparatus to which an exemplary embodiment may be applied.

Referring to FIG. 16, the wireless apparatus as an STA which may implement the exemplary embodiment may operate as an AP or a non-AP STA. Further, the wireless apparatus may correspond to the user or a transmitting terminal transmitting a signal to the user.

The wireless apparatus of FIG. 16 includes a processor 1610, a memory 1620, and a transceiver 1630 as illustrated in FIG. 16. Each of the processor 1610, the memory 1620, and the transceiver 1630 may be implemented as a separate chip or at least two blocks/functions may be implemented through one chip.

The transceiver 1630 is a device including a transmitter and a receiver and when a specific operation is performed, only an operation of any one of the transmitter and the receiver may be performed or both the operations of the transmitter and the receiver may be performed. The transceiver 1630 may include one or more antennas that transmit and/or receive radio signals. In addition, the transceiver 1630 may include an amplifier for amplifying a reception signal and/or a transmission signal, and a band-pass filter for transmission on a specific frequency band.

The processor 1610 may implement a function, a process, and/or a method proposed in this specification. For example, the processor 1610 may perform operations according to the exemplary embodiment. That is, the processor 1610 may perform the operations disclosed in the exemplary embodiments of FIGS. 1 to 15.

The processor 1610 may include an application-specific integrated circuit (ASIC), another chipset, a logic circuit, a data processing device and/or a converter converting a baseband signal and the radio signal into each other.

The memory 1620 may include a read-only memory (ROM), a random access memory (RAM), a flash memory, a memory card, a storage medium, and/or other storage devices.

Figure 17:
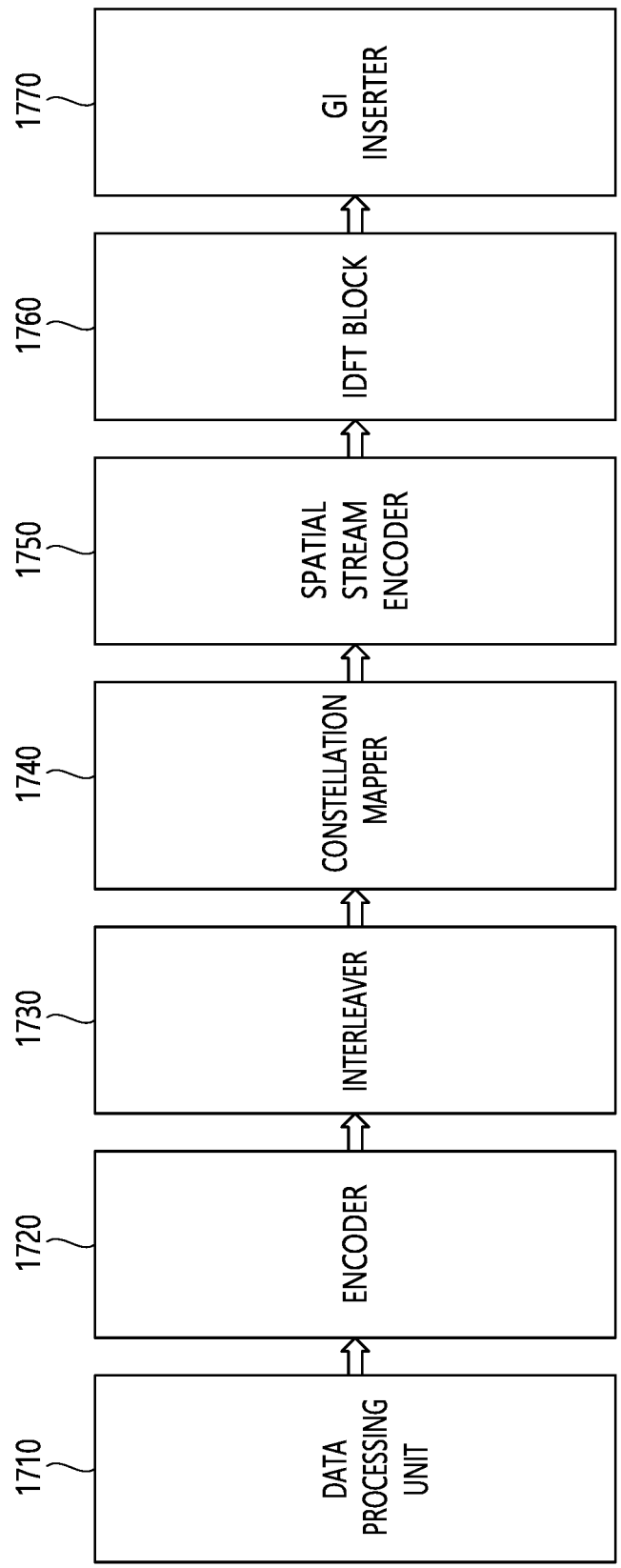
FIG. 17 is a block diagram illustrating one example of an apparatus included in a processor.

FIG. 17 is a block diagram illustrating one example of an apparatus included in a processor. For convenience of description, one example of FIG. 17 is described based on the block for the transmission signal, but it is apparent that the reception signal may be processed by using the corresponding block.

The illustrated data processing unit 1710 generates transmission data (control data and/or user data) corresponding to the transmission signal. An output of the data processing unit 1710 may be input into an encoder 1720. The encoder 1720 may perform coding through a binary convolutional code (BCC) or low-density parity-check (LDPC) technique. At least one encoder 1720 may be included and the number of encoders 1720 may be determined according to various information (e.g., the number of data streams).

The output of the encoder 1720 may be input into an interleaver 1730. The interleaver 1730 performs an operation of distributing consecutive bit signals on a radio resource (e.g., time and/or frequency) in order to prevent a burst error caused due to fading. At least one interleaver 1730 may be included and the number of interleavers 1730 may be determined according to various information (e.g., the number of spatial streams).

The output of the interleaver 1730 may be input into a constellation mapper 1740. The constellation mapper 1740 performs constellation mapping such as biphase shift keying (BPSK), Quadrature Phase Shift Keying (QPSK), quadrature amplitude modulation (n-QAM), etc.

The output of the constellation mapper 1740 may be input into a spatial stream encoder 1750. The spatial stream encoder 1750 performs data processing in order to transmit the transmission signal through at least one spatial stream. For example, the spatial stream encoder 1750 may perform at least one of space-time block coding (STBC), Cyclic shift diversity (CSD) insertion, and spatial mapping for the transmission signal.

The output of the spatial stream encoder 1750 may be input into an IDFT block 1760. The IDFT block 1760 performs inverse discrete Fourier transform (IDFT) or inverse Fast Fourier transform (IFFT).

The output of the IDFT block 1760 is input into a guard interval (GI) inserter 1770 and the output of the GI inserter 1770 is input into a transceiver 1730 of FIG. 17.

In the detailed description of this specification, although the detailed exemplary embodiments have been described, various modifications of the present disclosure can be made without departing from the scope and the technical spirit of this specification. Therefore, the scope of this specification should not be limited to the exemplary embodiments and should be defined by the appended claims and equivalents to the appended claims.

What is claimed is:

1. A method in a wireless LAN system, the method comprising:
   transmitting, by a first wireless terminal including a main radio module and a wake-up radio (WUR) module to a second wireless terminal, a WUR mode request frame including WUR rate information element related to a transmission rate of a wake-up packet (WUP),
   wherein the WUR rate information element includes a 2-bit field for one of a high transmission rate of the WUP or a low transmission rate of the WUP;
   wherein the WUR rate information element, based on a value of the 2-bit field set to "1", includes first setting information for the low transmission rate of the WUP, and
   wherein the WUR rate information element, based on the value of the 2-bit field set to "2", includes second setting information for the high transmission rate of the WUP; and
   receiving, by the first wireless terminal from the second wireless terminal, the WUP based on the WUR rate information element,
   wherein the WUP is modulated based on an on-off keying (OOK) scheme, and the WUP is received based on the WUR module.

2. The method of claim 1, wherein the high transmission rate of the WUP is set to 250 kbps and the low transmission rate of the WUP is set to 62.5 kbps.

3. The method of claim 1, wherein the WUP has a 20 MHz bandwidth, the WUP includes a legacy preamble and a WUP payload, the WUP payload is configured based on a 13-bit sequence, and a subcarrier interval applied to the WUP is set to 312.5 kHz.

4. A wireless terminal including a main radio module and a wake-up receiver (WUR) module in a wireless LAN system, the wireless terminal comprising:
   a transceiver transmitting or receiving a radio signal; and
   a processor controlling the transceiver,
   wherein the processor is implemented to:
   transmit a WUR mode request frame including WUR rate information element related to a transmission rate of a wake-up packet (WUP),
   wherein the WUR rate information element includes a 2-bit field for a high transmission rate of the WUP and a low transmission rate of the WUP;
   wherein the WUR rate information element, based on a value of the 2-bit field set to "1", includes first setting information for the low transmission rate of the WUP, and
   wherein the WUR rate information element, based on the value of the 2-bit field set to "2", includes second setting information for the high transmission rate of the WUP; and
   receive the WUP based on the WUR rate information element, the WUP is modulated based on an on-off keying (OOK) scheme, and
   wherein the WUP is received based on the WUR module.

5. The wireless terminal of claim 4, wherein the high transmission rate of the WUP is set to 250 kbps and the low transmission rate of the WUP is set to 62.5 kbps.

6. The wireless terminal of claim 4, wherein the WUP has a 20 MHz bandwidth, the WUP includes a legacy preamble and a WUP payload, the WUP payload is configured based on a 13-bit sequence, and a subcarrier interval applied to the WUP is set to 312.5 kHz.

* * * * *